(12) United States Patent
Morelli et al.

(10) Patent No.: US 7,443,808 B2
(45) Date of Patent: Oct. 28, 2008

(54) NETWORKING METHODS AND APPARATUS

(75) Inventors: John Morelli, San Jose, CA (US);
Adam Powers, Dublin, CA (US);
Joseph P. Preschutti, Boalsburg, PA (US); Ellwood D. Nonnemocher, State College, PA (US); David P. Koller, State College, PA (US)

(73) Assignee: Coaxsys, Inc., Los Gatos, CA (US)

( * ) Notice: Subject to any disclaimer, the term of this patent is extended or adjusted under 35 U.S.C. 154(b) by 998 days.

(21) Appl. No.: 10/852,002

(22) Filed: May 21, 2004

(65) Prior Publication Data
US 2005/0083856 A1 Apr. 21, 2005

Related U.S. Application Data

(60) Provisional application No. 60/472,531, filed on May 22, 2003.

(51) Int. Cl.
*H04L 12/28* (2006.01)
(52) U.S. Cl. .................................................. 370/254
(58) Field of Classification Search .......... 370/241, 370/238, 289, 503, 254, 465, 435, 406, 235, 370/428, 445, 463, 401, 402, 351; 455/427, 455/67.4, 522, 69, 73, 234, 423, 68; 709/224, 709/250; 375/296, 354, 371, 355, 90.01
See application file for complete search history.

(56) References Cited

U.S. PATENT DOCUMENTS

| | | | |
|---|---|---|---|
| 4,755,772 A | 7/1988 | Khanna | |
| 5,437,052 A | 7/1995 | Hemmie et al. | |
| 5,493,328 A | 2/1996 | Kroninger et al. | |
| 5,528,582 A | 6/1996 | Bodeep et al. | |
| 5,818,821 A | 10/1998 | Schurig | |
| 5,825,829 A | 10/1998 | Borazjani et al. | |
| 5,886,732 A | 3/1999 | Humpleman | |
| 5,926,479 A | 7/1999 | Baran | |

(Continued)

FOREIGN PATENT DOCUMENTS

WO  WO 97/00571  1/1997

(Continued)

OTHER PUBLICATIONS

Bhatti, Saleem N., et al., "On Management of CATV Full Service Networks: A European Perspective" IEEE Network, Sep./Oct. 1998, pp. 28-39.

(Continued)

*Primary Examiner*—Wing F. Chan
*Assistant Examiner*—Prenell P Jones
(74) *Attorney, Agent, or Firm*—Krieg DeVault LLP; L. Scott Paynter

(57) ABSTRACT

The present invention includes installing a computer network (51) in a building (24) by coupling together a hub (50, 350) and a number of network adapters (100, 400) together with previously installed cabling. Data signals are transmitted from the adapters (100, 400) to the hub (50, 350) within a first frequency range and converted to frequency-converted data signals within a second frequency range for transmission back to the adapters (100, 400). The network (51) interfaces to an ethernet bus (37) through each of the adapters (100, 400).

46 Claims, 12 Drawing Sheets

U.S. PATENT DOCUMENTS

| | | | |
|---|---|---|---|
| 5,936,963 | A | 8/1999 | Saussy |
| 5,982,412 | A | 11/1999 | Nulty |
| 6,014,545 | A | 1/2000 | Wu et al. |
| 6,023,612 | A | 2/2000 | Harris et al. |
| 6,055,418 | A | 4/2000 | Harris et al. |
| 6,069,899 | A | 5/2000 | Foley |
| 6,091,932 | A | 7/2000 | Langlais |
| 6,130,894 | A | 10/2000 | Ojard et al. |
| 6,167,120 | A | 12/2000 | Kikinis |
| 6,189,037 | B1 | 2/2001 | Adams et al. |
| 6,246,702 | B1 | 6/2001 | Fellman et al. |
| 6,295,280 | B1* | 9/2001 | Oh .................. 370/254 |
| 6,349,133 | B1 | 2/2002 | Matthews et al. |
| 6,366,776 | B1* | 4/2002 | Wright et al. ........ 455/427 |
| 6,377,782 | B1 | 4/2002 | Bishop et al. |
| 6,381,248 | B1 | 4/2002 | Lu |
| 6,414,952 | B2 | 7/2002 | Foley |
| 6,418,149 | B1 | 7/2002 | Swisher et al. |
| 6,490,727 | B1 | 12/2002 | Nazarathy et al. |
| 6,501,342 | B2 | 12/2002 | Marten |
| 6,507,585 | B1 | 1/2003 | Dobson |
| 6,519,773 | B1 | 2/2003 | Ahmed et al. |
| 6,530,087 | B1 | 3/2003 | Kobayashi et al. |
| 6,535,715 | B2 | 3/2003 | Dapper et al. |
| 6,542,585 | B2 | 4/2003 | Goodman |
| 6,654,958 | B1 | 11/2003 | Roberts et al. |
| 6,791,995 | B1 | 9/2004 | Azenkot et al. |
| 6,879,579 | B1 | 4/2005 | Myles et al. |
| 7,075,893 | B1* | 7/2006 | Mlinarsky et al. .......... 370/241 |
| 2001/0041531 | A1 | 11/2001 | Haight et al. |
| 2001/0056350 | A1 | 12/2001 | Calderone et al. |
| 2002/0039388 | A1 | 4/2002 | Smart et al. |
| 2002/0069417 | A1 | 6/2002 | Kliger et al. |
| 2002/0166124 | A1 | 11/2002 | Gurantz et al. |
| 2002/0174423 | A1 | 11/2002 | Fifield et al. |
| 2002/0194383 | A1 | 12/2002 | Cohen et al. |
| 2002/0194605 | A1 | 12/2002 | Cohen et al. |
| 2003/0050015 | A1* | 3/2003 | Kelly et al. ............. 455/67.4 |
| 2003/0066082 | A1 | 4/2003 | Kliger et al. |
| 2003/0093798 | A1 | 5/2003 | Rogerson |
| 2004/0060072 | A1 | 3/2004 | Klein |
| 2005/0083856 | A1 | 4/2005 | Morelli et al. |

FOREIGN PATENT DOCUMENTS

| | | |
|---|---|---|
| WO | WO 99/44352 | 9/1999 |
| WO | WO 00/28689 | 5/2000 |
| WO | WO 01/45305 | 6/2001 |
| WO | WO 01/69933 | 9/2001 |
| WO | WO 01/80030 | 10/2001 |

OTHER PUBLICATIONS

Dasigi, Venu, et al., "A Web-Based Interface for a Digital Broadband Home," Georgia, Date Unknown.

Feit, Frederic, et al., "The Home Network Revisited: Which LAN Technologies Will Bring the Network Home? A Comparative Analysis of Home Networking Infrastructures," University of Colorado, Date Unknown, pp. 1-11.

Figueiredo, JC, et al., "Home Networking: Home Infrastructure Design," Date Unknown, pp. 1-13.

Technical Committee, Computer Communications, "IEEE Recommended Practices for Broadband Local Area Networks," IEEE Computer Society, Oct. 1989, pp. 1-54.

Wu, Chiung-Shein, et al., "Architecture for High-Speed Internet Access Over CATV Networks in the Residential Area," Computer and Communication Research Labs, Industrial Technology Research Institute, Hsinchu, Taiwan, May 24, 1996, pp. 1-15.

Wu, Chiung-Shein, et al., "Architecture for Two-way Data Services Over Residential Area CATV Networks," Computer and Communication Research Labs, Industrial Technology Research Institute, Hsinchu, Taiwan, May 1997.

Lynx Broadband Systems, www.lynxbroadband.com/index.html, "RF Video Distributed on Cat 5 Cable," At the earliest Jan. 16, 2003, pp. 1-2.

Lynx Broadband Systems, www.lynxbroadband.com/app_casehistory1.html, "School Distributes RF Video on Category 5 Cable," At the earliest Jan. 16, 2003, pp. 1-3.

Lynx Broadband Systems, www.lynxbroadband.com, "RF Video and Ethernet, Telephone, or Remote Control on Cat 5 Cable," BH Electronics (www.bhelectronics.com) 2002.

Wu, C-S, Ma, G-K, & Lin, B-S.P.; Architecture for High-Speed Internet Access Over CATV Networks in the Residential Area; Computer & Communication Research Labs, Industrial Technology Research Institute, Hsinchu, Taiwan, May 24, 1996.

Supplementary European Search Report dated Sep. 7, 2007; European Patent Office, Munich, Germany.

* cited by examiner

NETWORKING METHODS AND APPARATUS

CROSS-REFERENCE TO RELATED APPLICATIONS

The present application claims the benefit of U.S. Provisional Patent Application No. 60/472,531 filed 22 May 2003, which is hereby incorporated by reference in its entirety.

INTRODUCTION

The present invention relates to networking, and more particularly, but not exclusively, relates to the implementation of a computer communication network with wiring previously installed for television programming transmission.

Interest has increasingly grown in the provision of broadband computer network communication services to personal residences. There is also a growing desire to provide a network for communication between devices within one's personal residence. Prior attempts to meet such needs suffer from poor reliability; complicated software, firmware, or hardware installation procedures; and/or high latency. Moreover, many of these schemes impose significant bandwidth constraints or significantly limit the distance that can separate devices connected to the in-residence network. Some attempt to address this latter drawback by implementing complicated automatic gain control schemes to account for variation in communication signal levels with different separation distances—typically adding considerable overhead to network communications. Thus, there is a demand for further contributions in this area of technology.

One embodiment of the present invention is a unique networking technique. Other embodiments include unique methods, systems, devices, and apparatus for networking devices. Such embodiments may also permit transmission of computer data with other forms of communication such as voice, video, or television programming to name just a few.

A further embodiment of the present invention includes installing a computer network by coupling a network hub and a number of network communication adapters together. The adapters communicate with one another through the hub and each include a bus interface to couple to other devices such as personal computers, routers, switches, game systems, audio/stereo systems, and the like. Adapters transmit communication signals to the hub in one frequency range, which the hub converts for retransmission to the adapters in a different frequency range. One adapter communicates with another adapter by sending a signal to the hub that addresses the other adapter, and the hub returns a frequency-converted version of the signal to all adapters.

In still another embodiment, a building is designated in which previously installed wiring was utilized to transmit voice communications, video, or television programming. A computer network is installed in this building by coupling a network hub and a number of network communication adapters together with the previously installed wiring. At the hub, a power reference signal is generated for transmission to the adapters through the wiring. The adapters selectively adjust signal power level in response to the reference signal. The hub also converts data signals sent by one of the adapters from a first frequency range to a second frequency range for transmission to another of the adapters. In one form, the power reference signal has a reference frequency outside the first frequency range and the second frequency range. In still other forms, the building may be a residential dwelling with the wiring provided in the form of coaxial cabling capable of transmitting television programming over a frequency range different than the first or second frequency ranges and the reference frequency.

Yet another embodiment of the present invention includes a system with a network having a number of network connectors wired together within a building. The system also includes a hub coupled to the network between the connectors and wiring external to the building. This hub is operable to pass communication signals from the external wiring to the connectors within the building. The hub includes a frequency translator to translate received data signals in a first frequency range to a second frequency range and a signal generator to provide a power reference signal within a third frequency range. A number of network adapters each include a transmitter to transmit modulated outgoing signals within the first frequency range to the hubs, a receiver to receive modulated incoming data signals within the second frequency range from the hub, and control circuitry selectively responsive to the reference signal that is within the third frequency range to selectively adjust signal power level. With this arrangement, computers in different rooms of the building can communicate with one another via corresponding room-located adapters connected together via the network and hub. It can also be arranged to transmit voice, video, and/or television programming through the network to appropriate devices.

Another embodiment comprises a computer network hub that includes a coaxial cable connector, a splitter, a diplex filter, a frequency translator, and a signal generator. The diplex filter has a high frequency connection, a low frequency connection coupled to the coaxial cable connector, and a combined frequency connection coupled to the splitter. The diplex filter is operable to pass television programming within a first frequency range from the coaxial cable connector through the low frequency connection to the splitter. The frequency translator is coupled to the high frequency connection and converts signals received from the splitter within a second frequency range to return signals within a third frequency range that are provided for output through the splitter. The signal generator is coupled to the high frequency connection of the diplex filter to provide a power reference signal through the splitter.

Yet another embodiment includes a network communication adapter with a coaxial cable network connector, a transmitter to provide modulated output signals within a first frequency range for output to the connector, a receiver operable to receive modulated input signals within a second frequency range from the connector, interface circuitry coupled to the receiver and transmitter that includes logic to communicate selected information with a local bus, and control circuitry coupled to the receiver and transmitter that is responsive to a power reference signal received through the connector to selectively adjust signal power level. In one form, this adjustment is only made once for each power cycle of the adapter.

Still further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
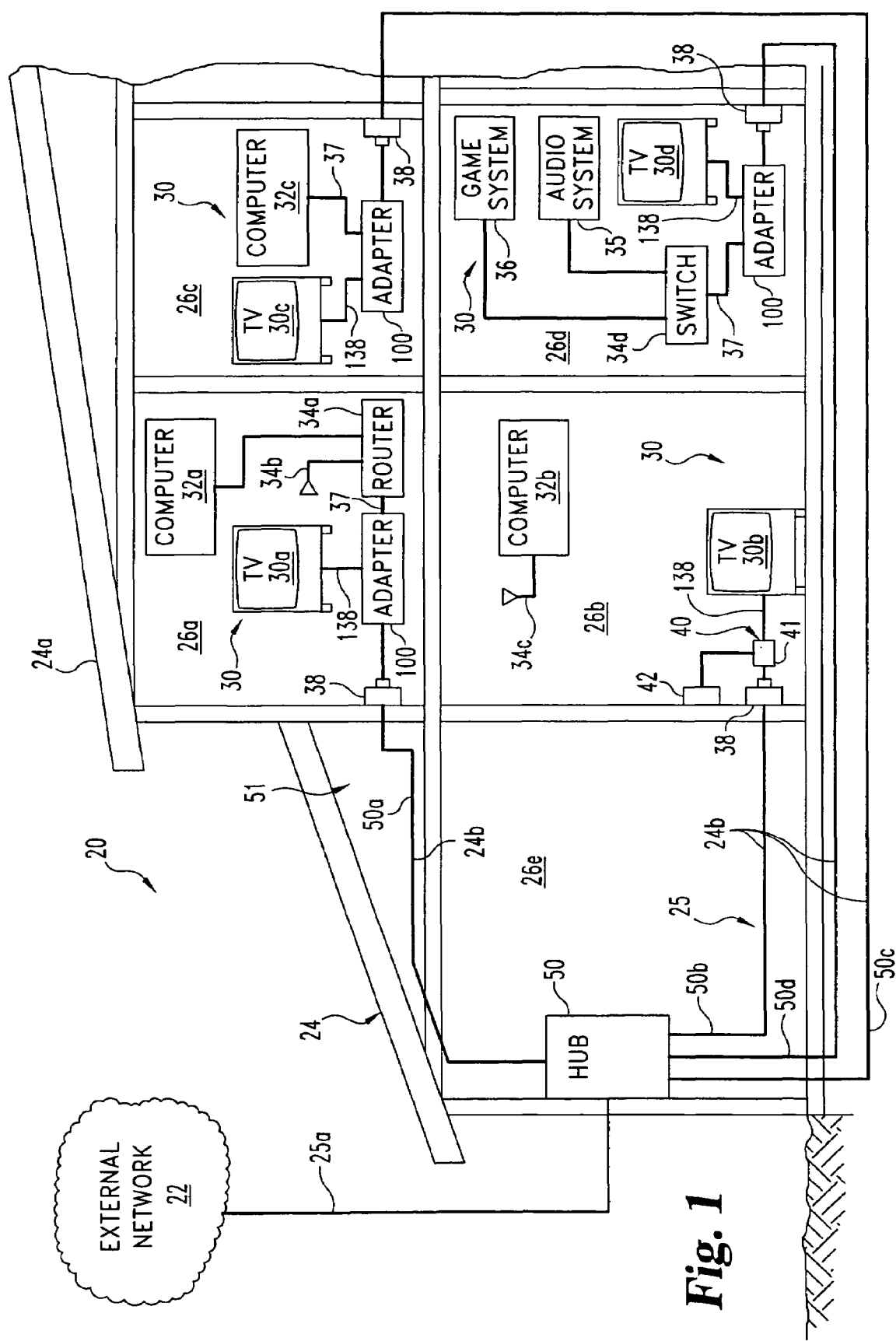
FIG. 1 is a schematic view of a network system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention includes an intra-building network system having a hub and a number of adapters connected by coaxial cabling. The hub is also connected to a coaxial cable from a network external to the building. This system permits the transmission of computer data from one adapter to another within the building via the hub, and the transmission of information, such as voice communications, video, television programming, and the like from the extreme network using the same cabling.

In one form, the adapters each include an ethernet bus interface. Correspondingly, equipment coupled to the ethernet bus of one adapter in one room of the building can communicate with other equipment coupled to the ethernet bus of another adapter in a different room of the building. Because different distances often separate the hub from different adapters, different signal power levels can result. In one form of the present invention, a power reference signal is generated and sent by the hub to all adapters to maintain desired communication signal power levels between the adapters and the hub. The networking system can be added to buildings by coupling the hub and adapters together with coaxial cabling previously installed for the transmission of television programming. This form is particularly appealing for residential dwellings in which an internal networking capability is desired. Nonetheless, in other embodiments coaxial cabling may be completely or partially replaced by another communication medium or media such as a different type of electrical wiring, optical transmission lines, and/or wireless transmission links. Alternatively or additionally, a building type other than a residential dwelling may be networked in accordance with the present invention and/or the present invention may be applied in situations where the networking medium/media, is installed after or at the same time as the hub or one or more adapters.

FIG. 1 depicts networking system 20 of a further embodiment of the present invention. In system 20, external network 22 is coupled to building 24. External network 22 includes a cable television distribution network, and may be of the type that provides a Wide Area Network (WAN) such as the internet, and/or Municipal Area Network (MAN). Building 24 is depicted in the form of residential dwelling 24a, which can be a single family home, duplex, apartment, or the like; however, in other embodiments, building 24 can be an office, another commercial or industrial type of dwelling, or such different building type as would be desired for application of the present invention.

Internal to dwelling 24a, is wiring network 24b in the form of coaxial cabling 25. Cabling 25 is the type commonly used to provide cable television programming within a home. Cabling 25 is in communication with network 22 via coaxial drop cable 25a that is at least partially external to dwelling 24a. Cabling 25 is coupled to cable 25a via networking hub 50. For the depicted example, cabling 25 includes separate cable lines 50a, 50b, 50c, and 50d connecting hub 50 to coaxial cable connectors 38 in rooms 26a, 26b, 26c, and 26d of dwelling 24a, respectively. Hub 50 is located in region 26e of dwelling 24a. Premises equipment, designated local devices 30, are coupled to each connector 38. Devices 30 include televisions (TVs) 30a, 30b, 30c, and 30d in respective rooms 26a, 26b, 26c, and 26d. Devices 30 also include computers 32a, 32b, and 32c, in rooms 26a, 26b, and 26c, respectively. Devices 30 further include Local Area Network (LAN) router 34a in room 26a; and switch 34d, audio system 35 and game system 36 in room 26d. Router 34a has a hardwired connection to computer 32a and includes a wireless communication link as represented by antenna 34b. Computer 32b in room 26b likewise includes antenna 34c representative of a wireless communication link with router 34a. In one embodiment, computer 32b is a laptop type of computer that is wirelessly linked to router 34a. For this laptop form, computer 32b can readily be used in various rooms of dwelling 24a, and optionally in nearby outdoor locations, while still maintaining a wireless network communication link. In other embodiments, wireless links may be absent or differently arranged, there may be more or fewer devices 30, devices 30 may vary in type and location from that depicted, and/or the number of rooms may be greater or fewer.

Each of rooms of 26a, 26c, and 26d include networking adapter 100 coupled between a corresponding connector 38 and one or more of devices 30. Adapters 100 each provide a corresponding ethernet bus port 37 and a common coaxial cable connection 138. Cable connections 138 are provided for coupling to corresponding televisions 30a, 30c, and 30d. In room 26b, television 30b is coupled to the corresponding connector 38 by coaxial cable connection 138 via power insertion module 40 which is described in more detail in connection with FIG. 7 hereinafter.

Collectively, hub 50, adapters 100, and cabling 25 provide premises network 51 that can also be utilized to distribute information in the form of computer network data, voice communications, audio programming, video (including, but not limited to security camera transmissions), and/or television programming, just to name a few. Moreover, network 51 can be used to communicate from one of devices 30 coupled to adapter 100 in one room to another of device 30 coupled to adapter 100 in another room. One or more external communication links other than network 22 may additionally or alternatively be coupled to hub 50 (not shown), such as a satellite television link, a satellite audio link, a satellite telephonic communication link, a security monitoring communication channel, and/or such other links as would occur to those skilled in the art. Devices 30 can include at least one cable modem for interconnecting network 51 to a computer network coexistent with television programming or other media on network 22. This external computer network can be of any type, such as a LAN, MAN, or WAN, and can include direct or indirect linkage to the internet/worldwide web. In other embodiments, more or fewer adapters 100 can be utilized and/or one or more additional coaxial cable splitters can be connected to one or more corresponding outputs of hub 50, or cables therefrom, to provide connections to additional adapters 100 and/or devices 30.

Figure 2:
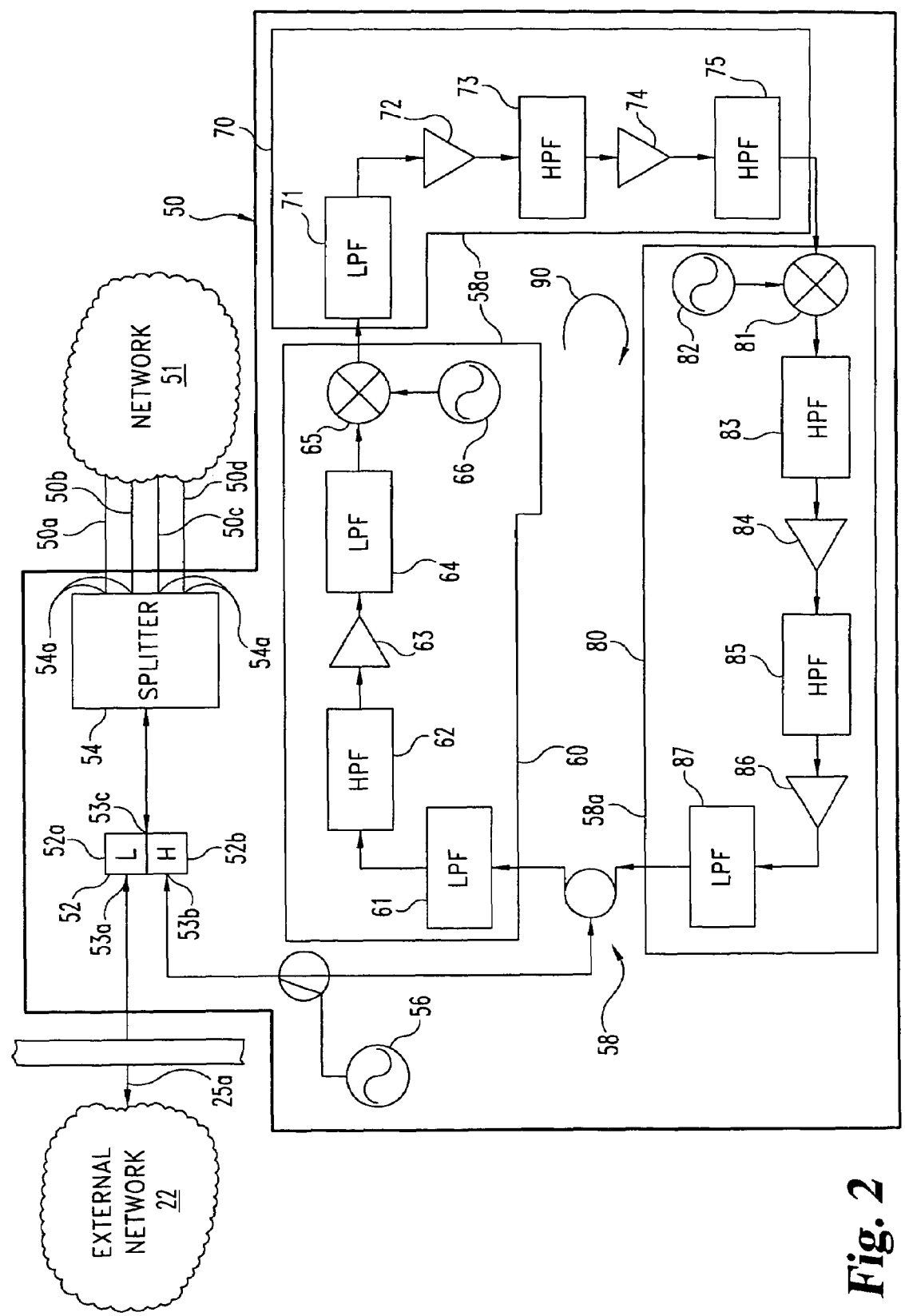
FIG. 2 is a schematic view depicting the hub of the system shown in FIG. 1 in greater detail.

The operation of system 20 and network 51 is further described in connection with the more detailed depiction of hub 50 and adapter 100 in FIGS. 2 and 3, respectively. In FIG. 2, hub 50 is shown in relation to network 22 and network 51; where like reference numerals refer to like features previously described. Hub 50 includes diplex filter 52, splitter 54, power reference signal generator 56, and frequency translator 58. Diplex filter 52 includes low frequency passband section 52a coupled to low frequency connection 53a, high frequency passband section 52b coupled to high frequency connection 53b, and combined frequency connection 53c, that pass frequencies from both passband sections 52a and 52b. Low frequency section 52a permits bidirectional passage of signals between connections 53a and 53c that are within low frequency band LB. High frequency section 52a permits bidirectional passage of signals between connections 53b and 53c that are within high frequency band HB. For the most part, low frequency band LB and high frequency band HB are nonoverlapping; however, the high frequency extreme portion of band LB may be generally common to the low frequency extreme portion of band HB to provide for a continuous combined passband through combined frequency connection 53c. Combined frequency connection 53c is connected to splitter 54. Splitter 54 is depicted with four coaxial cable ports 54a in FIG. 2. These ports are coupled to cable lines (runs) 50a, 50b, 50c, and 50d, respectively—interfacing hub 50 into network 51.

Generator 56 is coupled to high frequency connection 53b of filter 52 to provide a pilot tone signal at an established frequency PT. Typically, this pilot tone remains approximately constant during operation of hub 50 and is of a sinusoidal form; however, in other embodiments, the pilot tone can vary in a desired manner. The pilot tone operates as a power reference signal for adapters 100 coupled to hub 50 as will be more fully explained in connection with FIGS. 3 and 6 hereinafter.

Frequency translator 58 is also coupled to high frequency connection 53b of filter 52. Translator 58 includes translator circuitry 58a which defines downconverter 60, intermediate signal conditioner 70, and upconverter 80. Collectively, downconverter 60, conditioner 70, and upconverter 80 define return signal path 90 represented by the like-designated loop in FIG. 2. Return signal path 90 is utilized to receive and distribute modulated communication signals. In one form, a Vestigial SideBand Amplitude Modulation (VSB-AM) technique is utilized. VSB-AM generally transmits most of a first sideband or lobe and a portion or "vestige" of a second sideband, and generally provides a good way to conserve spectral occupancy without the stringent transmission characteristics associated with other modulation schemes. Alternatively or additionally, a Pulse Amplitude Modulation (PAM) technique is utilized. In still other embodiments, one or more different modulation techniques can be utilized as would occur to those skilled in the art.

Signals transmitted to hub 50 that are within frequency band HB are passed to frequency translator 58. Downconverter 60 translates signals within downconverter frequency band DB (range DL to DH) to an intermediate frequency band IB (range IL to IH) for conditioning by signal conditioner 70. Signal conditioner 70 outputs signals in frequency band IB for upconversion by upconverter 80 to frequency band UB (range UL to UH). For the depicted embodiment, each of the DB, IB, and UB frequency bands involve filtering with cutoff frequencies at the corresponding upper and lower frequency extremes of the respective frequency band, and also involve modulation with local oscillators to preserve a desired modulation technique and corresponding carrier frequency. In one nonlimiting example, frequency band UB is above frequency band IB and DB, with frequency band DB being above frequency band IB; where bands UB, DB, and IB do not overlap one another.

For downconverter 60, Low Pass Filter (LPF) 61 has a low pass frequency cutoff set to high frequency extreme DH so that signals with frequencies above this extreme are more greatly attenuated relative to signals with frequencies below this extreme. Correspondingly, signals with frequencies below DH are passed to High Pass Filter (HPF) 62 with the greatest relative strength. Filter 62 has low frequency cutoff DL, providing an output of signals in frequency band DB to amplifier 63. Amplifier 63 increases the gain to account for losses through low pass filter 61 and high pass filter 62, as well as anticipated loss for subsequent filtering with low pass filter 64. Filter 64 utilizes approximately the same low pass cutoff frequency DH as filter 61 to remove higher frequency noise introduced by amplifier 63. The output of low pass filter 64 is provided as an input to mixer 65 along with the output of local oscillator 66. Frequency LO1 of local oscillator 66 is greater than each of the frequency extremes DL and DH of frequency band DB, and is selected relative to these extremes and a desired modulation carrier frequency to provide a desired input for conditioner 70.

Conditioner 70 utilizes filtering and amplification to provide signals in frequency band IB as converted from frequency band DB of downconverter 60. Conditioner 70 includes low pass filter 71 receiving the output of mixer 65. Filter 71 has low pass cutoff frequency IH, which is selected relative to frequency LO1 of local oscillator 66, a desired modulation carrier frequency, and the frequency extremes of frequency band DB. The output of low pass filter 71 is provided to amplifier 72, with a gain to account for undesired losses. The output of amplifier 72 is input to high pass filter 73 having high pass filter cutoff frequency IL corresponding to the low frequency extreme of band IB. The output of high pass filter 73 is provided as an input to amplifier 74, which in turn has an output provided to a second high pass filter stage, high pass filter 35, which utilizes the same high pass cutoff frequency (IL) to remove undesired artifacts that may be introduced by amplifier 74. The output of high pass filter 75 corresponds to the output of conditioner 74, which provides signals in frequency band IB with a greater relative strength than signals with frequencies outside band IB. The multistage arrangement of conditioner 70 has been found to provide generally stable, intermediate frequency signals with reduced occurrence of undesirable oscillations.

The output of conditioner 70 is provided to mixer 81 of upconverter 80 which also receives input from local oscillator 82 at frequency LO2. Frequency LO2 is selected in relation to frequency bands IB and UB, and a desired modulation carrier frequency for band UB. High pass filter 83 receives the output of mixer 81 and has a high pass cutoff frequency of UL. High pass filter 83 outputs the filtered signal to amplifier 84. Amplifier 84 provides a desired level of gain with output to high pass filter 85. Filter 85 has approximately the same cutoff frequency as filter 83. The output of filter 85 is then input to amplifier 86 to account for filtering loss and anticipated loss in subsequent stages. The output of amplifier 86 is input to low pass filter 87 which has a low pass cutoff frequency of UH, the upper extreme for frequency band UB. Filter 87 outputs signals with a greater relative strength within frequency band UB than signals with frequencies outside band UB. Signals output by upconverter 80 are returned through the high frequency section 52b of diplex filter 52 to splitter 54.

Utilizing the frequency band convention previously described in connection with hub 50, adapters 100 of system 20 are arranged to transmit modulated communication signals in the DB frequency band and to receive modulated communication signals in the UB frequency band. Hub 50 converts signals sent by adapters 100 within frequency band DB to signals in frequency band UB, and returns the frequency-converted signals for receipt by adapters 100 coupled to hub 50. In this manner, adapters 100 communicate with one another via hub 50. Before further describing the adapter/adapter communication protocol, further details concerning adapter 100 are next described in connection with FIG. 3.

Figure 3:
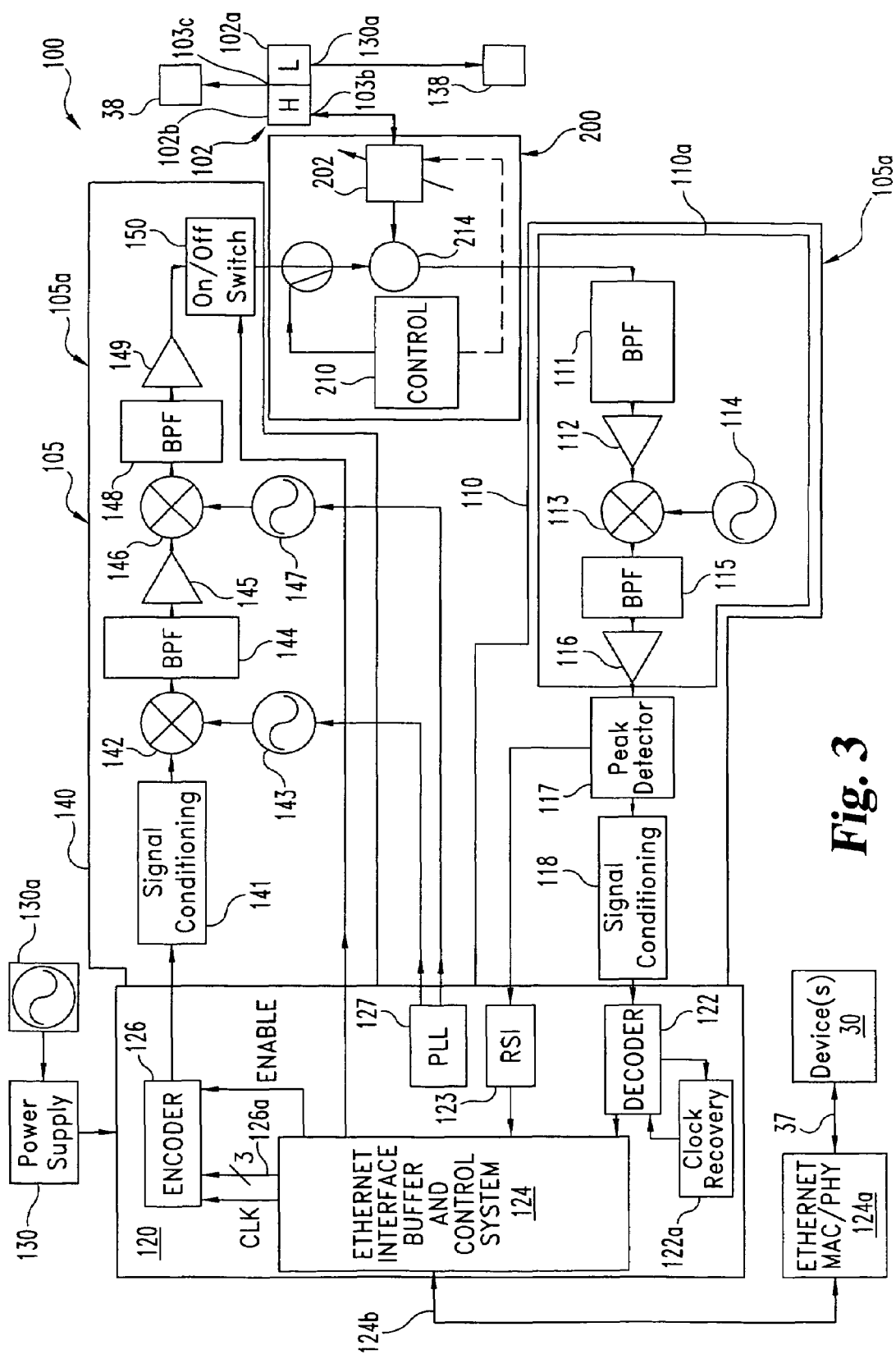
FIG. 3 is a schematic view depicting an adapter of the network shown in FIG. 1 in greater detail.

Referring to FIG. 3, adapter 100 includes analog circuitry 105, control/interface circuitry 120, ethernet control logic 124a, and power supply circuitry 130; where like reference numerals refer to like features previously described. FIG. 3 also schematically depicts device(s) 30, ethernet bus port 37, connector 38, and coaxial cable connection 138 in relation to adapter 100. Circuitry 105 includes diplex filter 102, modem 105a, and signal power regulation circuitry 200. Diplex filter 102 is configured like diplex filter 52 of hub 50, having low frequency passband section 102a corresponding to low frequency band LB and high frequency passband section 102b corresponding to high frequency band HB. Diplex 102 includes low frequency connection 103a coupled to coaxial cable connection 138, high frequency connection 103b coupled to circuitry 200 and combined frequency connection 103c connected to coaxial cable connector 38 (typically by an intervening length of coaxial cable).

Modem 105a includes receiver 110 and transmitter 140 both coupled to interface/control circuitry 120 and circuitry 200. When a modulated communication signal is sent from hub 50 to adapter 100 via connector 38 that is within frequency band HB, diplex filter 102 passes such signal from connection 103c to connection 103b. This signal then passes through circuitry 200 to receiver 110. Receiver 110 includes front-end receiver circuitry 110a. Circuitry 110a includes BandPass Filter (BPF) 111, amplifier 112, mixer 113, local oscillator 114, bandpass filter 115, and amplifier 116. Bandpass filter 111 filters modulated input signals to provide an output in which signals outside frequency band UB are attenuated relative to those signals within frequency band UB. The output from filter 111 is amplified by amplifier 112 and provided as input to mixer 113. Mixer 113 also receives input from local oscillator 114. The frequency of local oscillator 114 is selected in relation to the modulation characteristics of the received signal within the UB frequency band to convert such signal to a desired intermediate frequency band RIF. The output of mixer 113 is then submitted to a bandpass filter 115 which provides an output within frequency band RIF. The output of filter 115 is amplified by amplifier 116.

From circuitry 110a, the output of amplifier 116 is provided to amplitude peak detector 117. The output of detector 117 is provided to signal conditioning circuitry 118, which further conditions the signal for input to decoder 122 of interface/control circuitry 120. The output of detector 117 is also provided to Receive Signal Indicator (RSI) 123 of circuitry 120 to indicate any signal that might be within the desired band near the level expected from another adapter 100.

Decoder 122 converts the input to a serial, binary digital format from a Multi-Level Transition (MLT) encoded format. The particular MLT format is more fully described in connection with encoder 126 hereinafter. Decoder 122 is coupled to clock recovery circuitry 122a which determines a clock rate from the encoded signal for use by decoder 122. The decoded output of decoder 122 is provided on a 3-bit wide bus connected to interface/control logic 124. The output of RSI 125 is also provided to interface/control logic 124. Logic 124 controls signal interfacing with circuitry 105 and defines a 100BASETX ethernet interface and buffer. Logic 124 is coupled to ethernet control logic 124a by a 32 bit-wide Industry Standard Architecture (ISA) bus 124b connected between logic 124 and 124a. Logic 124a defines an ethernet Media Access Controller (MAC) and Physical Layer Controller (PHY) and is coupled to ethernet bus port 37 previously described. Logic 124a is configured for ethernet compatible communication with device(s) 30 coupled to ethernet bus port 37. For adapter 100 to receive a data packet on ethernet bus port 37, the ethernet MAC operates in a promiscuous mode, such that logic 124a receives all data packets, even if not intended for logic 124a/adapter 100. In this promiscuous mode, logic 124a stores all received data packets into an internal memory (not shown). When logic 124/logic 124a determines that data is to be transmitted with transmitter 140, the data is read from the internal memory of logic 124a and sent to logic 124 via bus 124b. Logic 124 buffers this data in its own internal memory (not shown).

Data buffered with logic 124 for transmission with transmitter 140 of modem 105a, is sent to encoder 126 for encoding. The data to be encoded is submitted via a three-bit wide bus 126a. A binary clock pulse signal CLK and a binary enable signal ENABLE are also sent to encoder 126 as depicted in FIG. 3. Encoder 126 utilizes a five-level MLT encoding format. In this format, an alternating electrical waveform is utilized that has five relative amplitude states: −1.0, −0.5, 0.0, +0.5, and +1.0. The waveform is broken down into discrete time intervals that each correspond a to an encoded bit. For any transition from one interval to the next in accordance with the progression 0.0, −0.5, −1.0, −0.5, 0.0 +0.5, +1.0, +0.5, a binary 1 is represented; however, for any intervals in which there is no transition, a binary 0 is represented. Accordingly, encoder 226 performs 4b/5b error encoding on the data to protect it from errors. Decoder 122 is operable to decode the same MLT-5 error encoding format as that provided with encoder 126.

The encoded output from encoder 126 is input to signal conditioning circuitry 141 of transmitter 140. Circuitry 141 includes filtering to limit the encoded signal to a desired range. The output of circuitry 141 is provided to mixer 142 along with the output of local oscillator 143. The output products of mixer 142 are provided as input to bandpass filter 144. Filter 144 provides a modulated signal in an intermediate frequency band TIF. The output of bandpass filter 144 is amplified with amplifier 145 and provided to mixer 146 along with the output of local oscillator 147. Oscillators 143 and 147 participate in a Phase-Locked Loop (PLL) as controlled by PLL circuitry 127, which is included in circuitry 120. The output of mixer 146 provides signal products within the range of the DB frequency band. Bandpass filter 148 produces an output that is amplified by amplifier 149 in which the modulated communication signals within frequency band DB has a greater relative strength than signals outside this band. The gain and frequency parameters of oscillators 143 and 146, filters 144 and 148, and amplifiers 145 and 149 are selected to provide a desired form of communication signal modulation, carrier frequency, signal range, and the like.

The output of amplifier 149 is submitted to on/off switch 150 that is controlled by circuitry 120. Switch 150 is symbolic of the ability to connect and disconnect transmitter 140 from circuitry 200 and diplex filter 102. When switch 150 is closed (on), adapter 100 operates in a transmit mode. When switch 150 is open (off), adapter 100 operates in a receive mode, preventing data transmission therefrom. Thus, under the control of circuitry 120, switch 150 changes between transmit and receive modes of operation.

Figure 6:
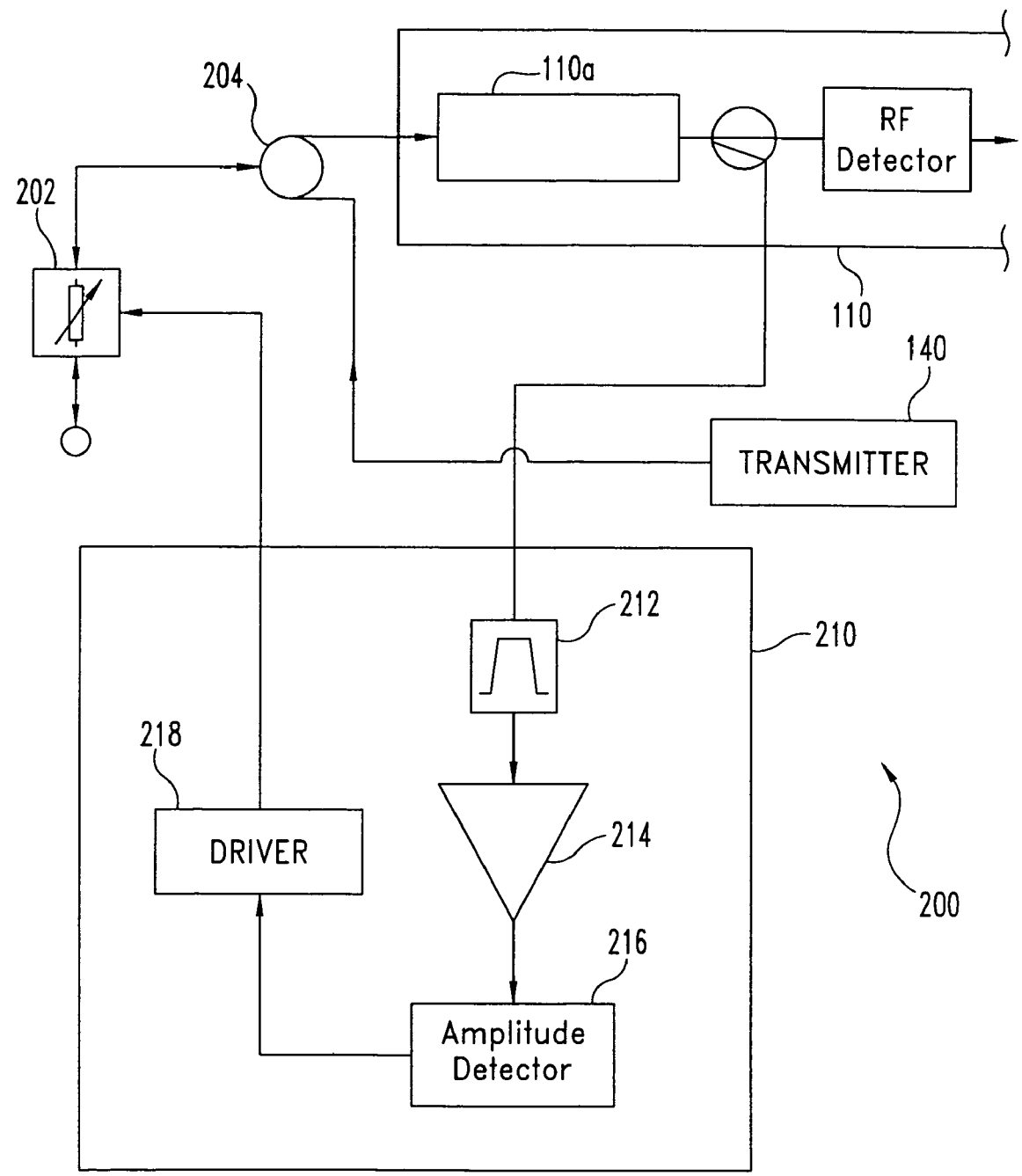
FIG. 6 is a schematic view showing gain control circuitry of FIG. 3 in greater detail.

Referring to FIGS. 2, 3, and 6, circuitry 200 is further described. Generator 56 of hub 50 outputs a generally constant pilot tone at frequency PT that is received by adapters 100 connected to network 51. Circuitry 200 provides a closed-loop, automatic regulation of the modulated output signal level from transmitter 140 and receiver gain of receiver 110 based on the strength of the received pilot tone. The pilot tone is measured at the output of circuitry 110a by power control circuitry 210, and attenuator 202 is correspondingly adjusted to maintain a reference signal power level. This reference signal power level is set by the design and/or during calibration of adapter 100. The reference level typically is selected relative to a range of transmission and/or reception power levels desired for each adapter 100. In one mode, the signal power level of receiver 110 and/or transmitter 140 is adjusted once each time adapter 100 is powered up (i.e. for each power cycle of adapter 100). Because the length of the cable connecting the particular adapter 100 and hub 50 is not expected to change while such adapter 100 is powered on, a power level adjustment once for each adapter power cycle at "power on" is generally sufficient. Advantageously, this approach eliminates the overhead of attempting to lock onto a signal every time data is transmitted to assure proper signal power levels.

FIG. 6 illustrates power control circuitry 210 in greater detail. Circuitry 210 includes bandpass filter 212 with a narrow frequency band configured to detect the pilot tone frequency PT provided with generator 56. The output of filter 212 is provided to amplifier 214 to provide an appropriate gain level which is output to amplitude detector 216. The output of detector 216 is input to driver 218 to direct the operation of attenuator 202. In one embodiment, attenuator 202 is of a PIN diode device type; however, it can be of a different type as would occur to those skilled in the art in other embodiments.

During operation, if two adapters 100 attempt to send data over cabling 25 at the same time the data can become untrustworthy because of possible interference between the different data signals. Such situation can cause a data collision. It should be understood that when an adapter 100 is transmitting within frequency band DB it is also receiving its own data back from hub 50 within frequency band UB as are the remaining adapters 100. Logic 120 of a given adapter 100 performs a comparison of received data following the transmission to ensure that the transmitted and received data are the same. If the data is not the same, a collision is presumed to be the cause. Accordingly, under the control of logic 120, the given adapter 100 transmits a jamming signal to indicate to all the other adapters 100 that a collision has occurred, and that the recently received data should be discarded. A wait state for a quasi-random amount of time is then executed before the given adapter 100 attempts to send the data again. In this manner, hub 50 and adapters 100 provide means for computer networking of building 24 with coaxial cabling originally provided for television program transmission.

Power supply 130 provides power to adapter 100, and is of a standard type. Supply 130 provides a Direct Current (DC output) at one or more voltage and/or current levels as required to power adapter 100. Supply 130 derives its power from standard Alternating Current (AC) electrical power provided dwelling 24a as represented by the connected AC outlet 130a. System 20 is particularly amenable to application in homes where there is previously installed coaxial cabling for the delivery of television programming. However, in other embodiments coaxial cabling may be completely or partially replaced by another communication medium or media such as a different type of electrical wiring, optical transmission lines, and/or wireless transmission links. Moreover, the cabling or other network media can be installed concurrent with or after any of hub 50 and adapters 100. Likewise, in still other embodiments, the resulting network need not accommodate transmission of different information/communication types. In a further embodiment, interface circuitry 120 is defined by a Field Programmable Gate Array (FPGA) device, which provides for ready field change—often without the need to employ hardware jumpers and/or software adjustments. Other circuitry of adapter 100 and/or hub 50 can be implemented in one or more programmable, dedicated, and/or Application Specific Integrated Circuit (ASIC) devices. Alternatively or additionally, more or fewer filters, mixers, oscillators, and/or amplifier stages can be utilized in hub 50 or adapter 100 as would occur to those skilled in art.

Figure 4:
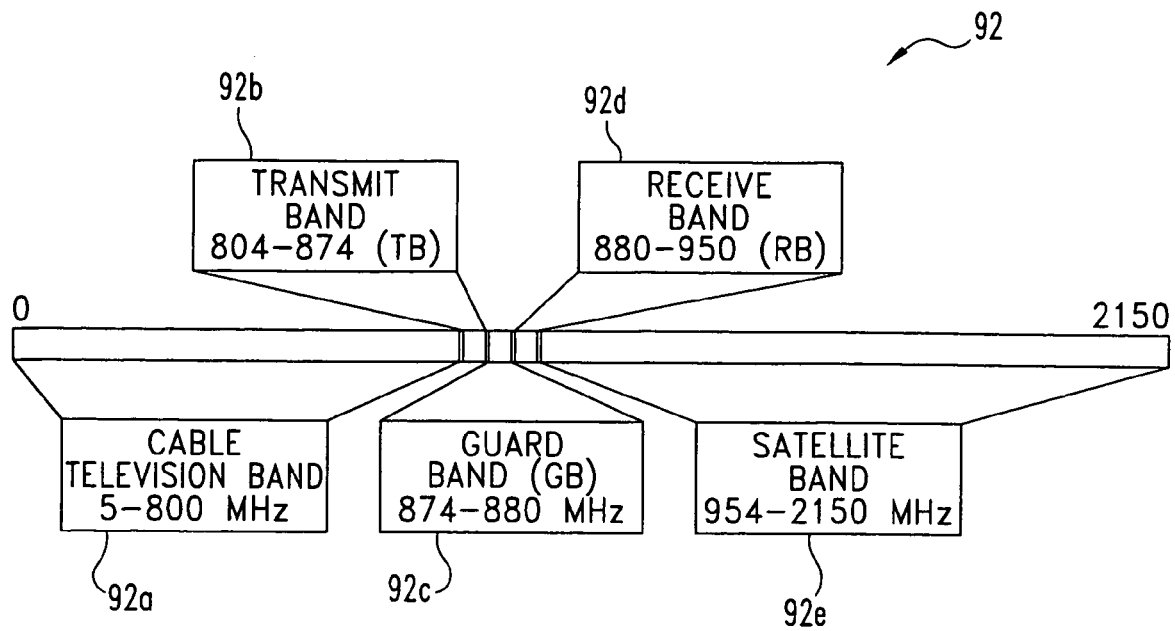
FIG. 4 is diagrammatic view of various frequency ranges for one implementation of the system of FIG. 1.

Referring to FIG. 4, the implementation of one nonlimiting frequency plan directed to the concurrent use of system 20 for broadband computer data networking and television programming transmission is next described. FIG. 4 depicts a signal frequency range 92 that extends from 0 to 2150 MegaHertz (MHz). Within range 92, frequency band 92a of 5-800 MHz is the lowest, and corresponds to frequencies commonly used for the transmission of cable television channels within the home. Frequency band 92e of 954-2150 MHz is the highest frequency band and corresponds to frequencies for television programming derived from satellite transmissions. Band 92b of 804-874 MHz corresponds to a frequency band for transmitting modulated communication signals from adapters 100 to hub 50. Band 92b represents one example of frequency band DB previously described (DL=804 MHz and DH=874 MHz), and is alternatively designated a transmission band TB. Band 92d of 880-950 MHz corresponds to a band for receiving modulated communication signals at adapters 100 from hub 50. Band 92d represents one example of frequency band UB previously described (UL=880 MHz and UH=950 MHz), and is alternatively designed receive band RB. Between frequency bands 92a and 92b is a guard band GB, represented as frequency band 92c.

Figure 5:
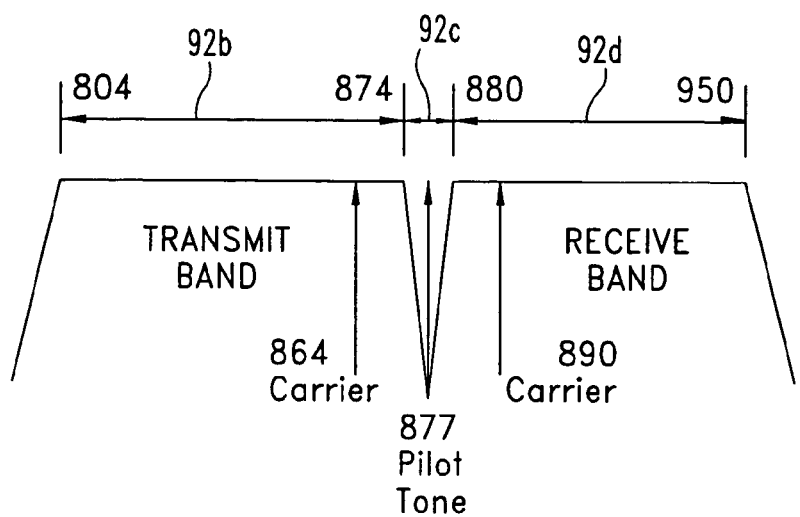
FIG. 5 is a diagrammatic view showing selected signal frequency relationships of FIG. 4 in greater detail.

FIG. 5 provides a further illustration of bands 92b, 92c, and 92d; and depicts the frequency of the pilot tone for generator 56 as being about 877 MHz (PT=877 MHz) for this particular example. Correspondingly, diplex filter 52 is arranged so that LB=5-804 MHz and HB=804-954 MHz in this implementation. For an application utilizing this frequency plan with VSB-AM, a carrier frequency of about 864 MHz for band DB (TB) and a carrier frequency of 890 MHz for band UB was utilized, with LO1 of oscillator 66 being about 954 MHz and LO2 of oscillator 82 being about 800 MHz in hub 50. Continuing this VSB-AM example for adapter 100, frequency band RIF is about 325-295 MHz (carrier of about 335 MHz), the frequency of oscillator 114 is about 555 MHz, frequency band TIF is about 230-300 MHz (carrier of about 240 MHz), the frequency of oscillator 143 is about 240 MHz, and the frequency of oscillator 147 is about 1104 MHz. However, in other embodiments, different frequency arrangements can be utilized, including those with different bandwidths, with frequency ranges overlapping at least some cable television/satellite channel frequencies, and such other differences as would occur to those skilled in the art.

Figure 7:
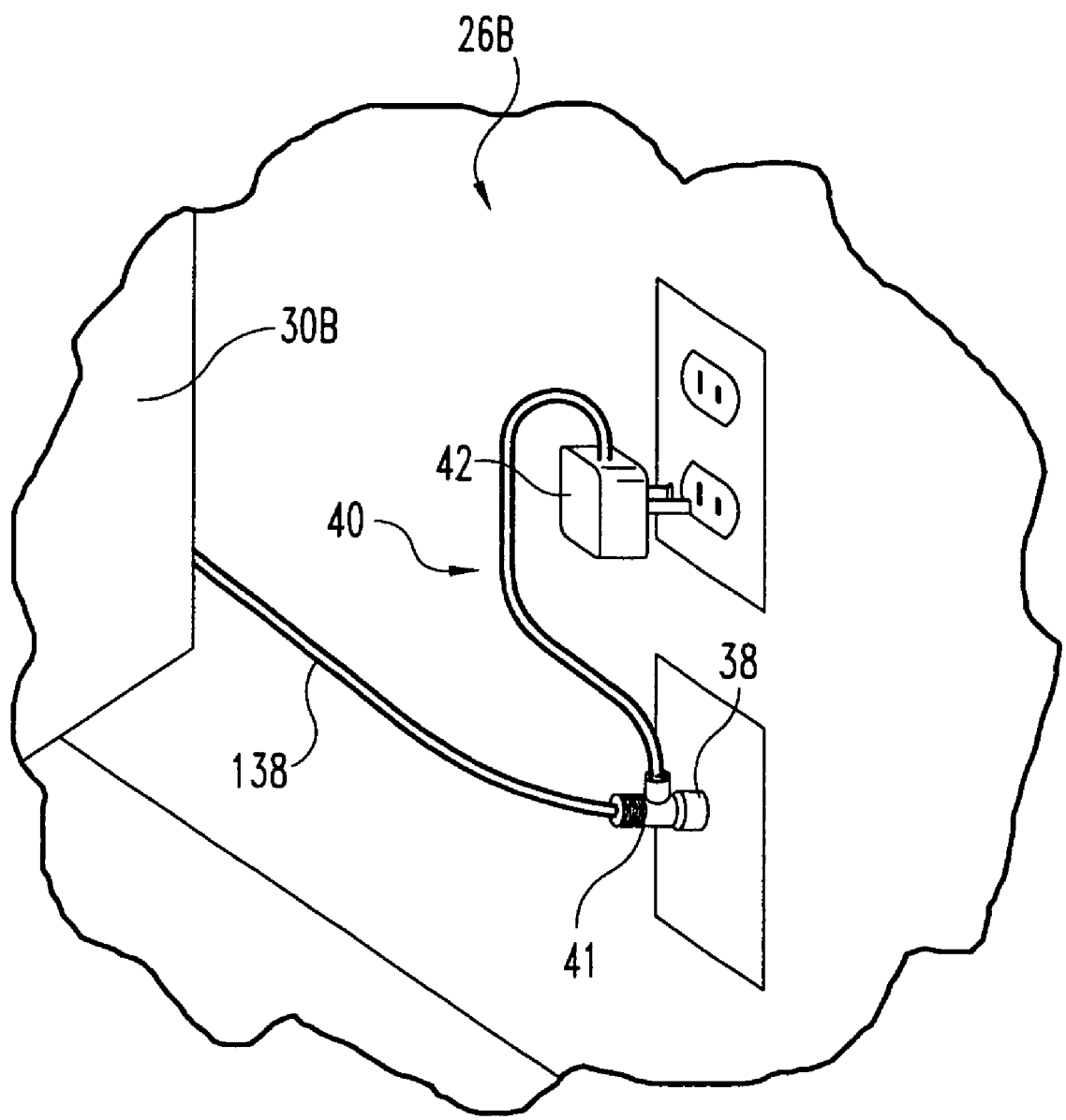
FIG. 7 is a diagrammatic view depicting the power insertion module of the system shown in FIG. 1 in greater detail.

Referring next to FIGS. 1 and 7, it is recognized that in certain applications, it may be desired to locate hub 50 in a position where there is no a convenient source of electrical power for where it is not available. For example, in an embodiment where hub 50 and/or adapters 100 are installed to make use of pre-existing cabling 25, hub 50 may be most advantageously located where a passive splitter was originally installed. Sometimes, this passive splitter is located just outside building 24 and/or is an inconvenient distance from an electrical power source. Under such conditions, power suitable to operate hub 50 can be provided via cabling 25 of network 51. As illustrated in FIG. 1, power insertion assembly 40 includes power insertion module 41 and power supply 42. Module 41 is provided between connector 38 and coaxial cable connection 138 in room 26b. Further, power supply 42 is coupled to a conventional electrical power outlet and is also coupled to module 41. Supply 42 may be of a AC to DC type that provides a suitable DC voltage to power hub 50 across the conductors of a corresponding cable (in this case cable 50b). Hub 50 then draws electrical power from the inserted DC voltage on cable 50b. Advantageously, power supply 40 is of a current limiting type to avoid damage should a splitter be inserted between hub 50 and assembly 40. In other embodiments, hub 50 may alternatively or additionally be arranged with an internal power supply suitable for direct connection to a power source, hub 50 may be arranged for direct connection to an external power supply (that in turn is coupled to a power source), hub 50 may include a battery-based electric power source, and/or may otherwise be powered using techniques known to those skilled in the art.

Network system 320 of another embodiment of the present application is illustrated in FIGS. 8-11; where like reference numerals refer to like features of previously described embodiments. System 320 includes external network 22 that is coupled to building 24 via coaxial drop cable 25a in the manner previously described in connection with system 20. In lieu of hub 50 and adapters 100 of system 20, system 320 includes network hub 350 and network communication adapters 400, respectively. Hub 350 is schematically detailed in FIG. 8 and adapter 400 is schematically detailed in FIGS. 10 and 11. Collectively, hub 350, adapters 400, and cabling provide premises network 351, which is the same as network 51 except for the exchange of hub 350 for hub 50, and adapters 400 for adapters 100. Correspondingly each of adapters 400 includes ethernet bus port 37 (See FIG. 10) coupled to one or more of devices 30 as shown for adapters 100 of system 20 in FIG. 1.

Figure 8:
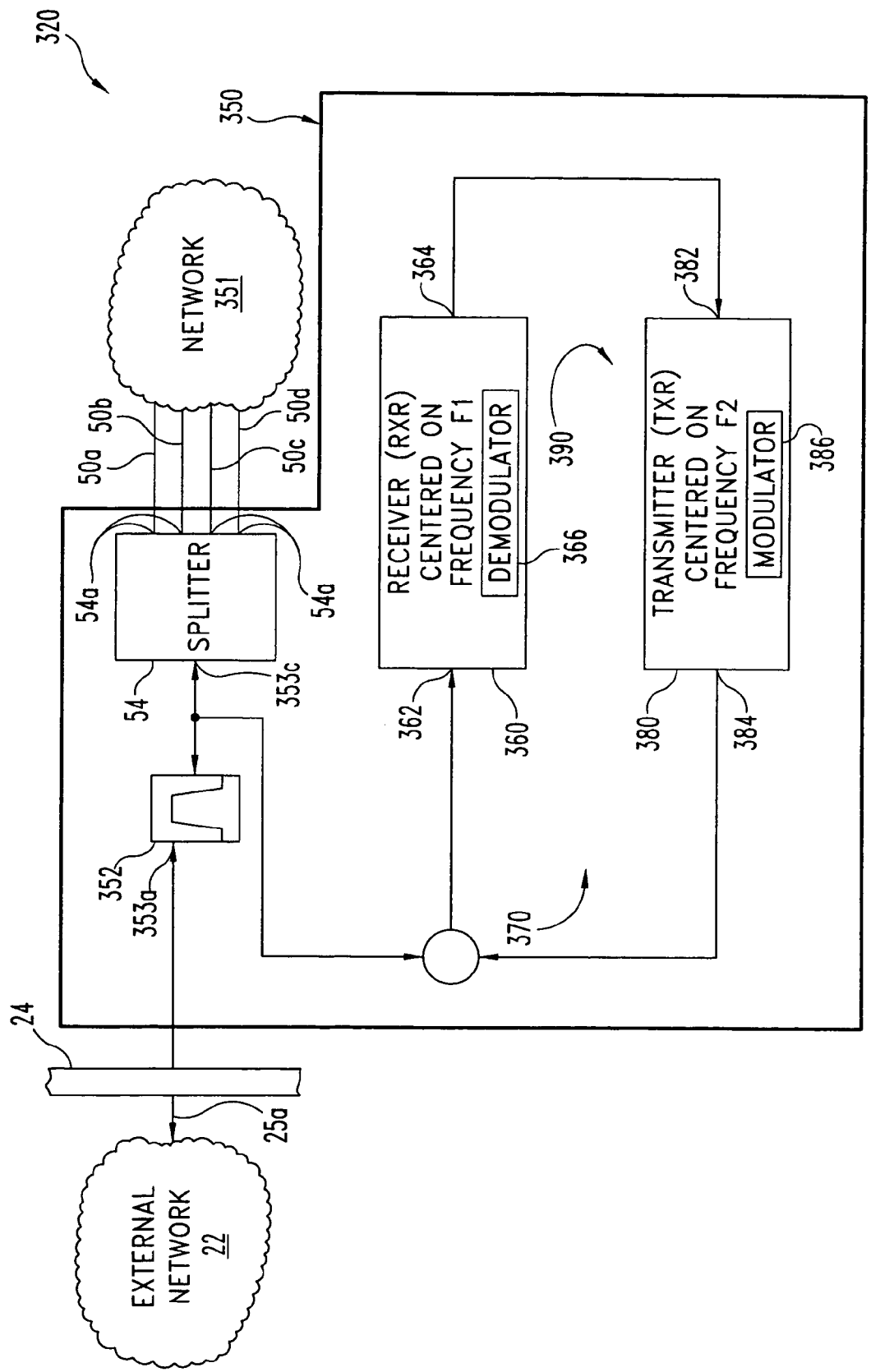
FIG. 8 is a schematic view of another network system, including a network hub.

Referring specifically to FIG. 8, hub 350 includes splitter 54, filter 352, coaxial cable interface 353a, and adapter signal frequency translator 370. Hub 350 may further include a pilot tone generator or the like (not shown) as previously described in connection with system 20. Splitter 54 includes signal port 353c and coaxial cable ports 54a. Ports 54a are each coupled to a corresponding cable line 50a, 50b, 50c, or 50d of network 351. Splitter 54 operates in the same manner as previously described with signals bidirectionally passing between signal port 353c and ports 54a. In particular, a signal passing from port 353c to ports 54a is split among ports 54a either actively or passively. In other embodiments, more or fewer cable lines are connected to splitter 54 and/or more or fewer coaxial cable ports 54a are provided in splitter 54.

External network 22 is connected via cable 25a to interface 353a. Typically interface 353a is near a point of entry of cable 25a into dwelling 24. Filter 352 is operable to reduce or effectively eliminate the transmission of signals in a specified frequency range or "stop band." Filter 352 is provided to prevent transmission of such signals from hub 350 to external network 22. Furthermore, this stop band corresponds to operational frequency ranges specific to modulated data signals transmitted to/from hub 350 and adapters 400 over network 51. Filter 252 further permits frequencies outside the stop band to bidirectionally pass to/from splitter 54, which typically includes modulated cable television programming, satellite television programming, and any related broadband computer network data transmission bandwidths.

Figure 9:
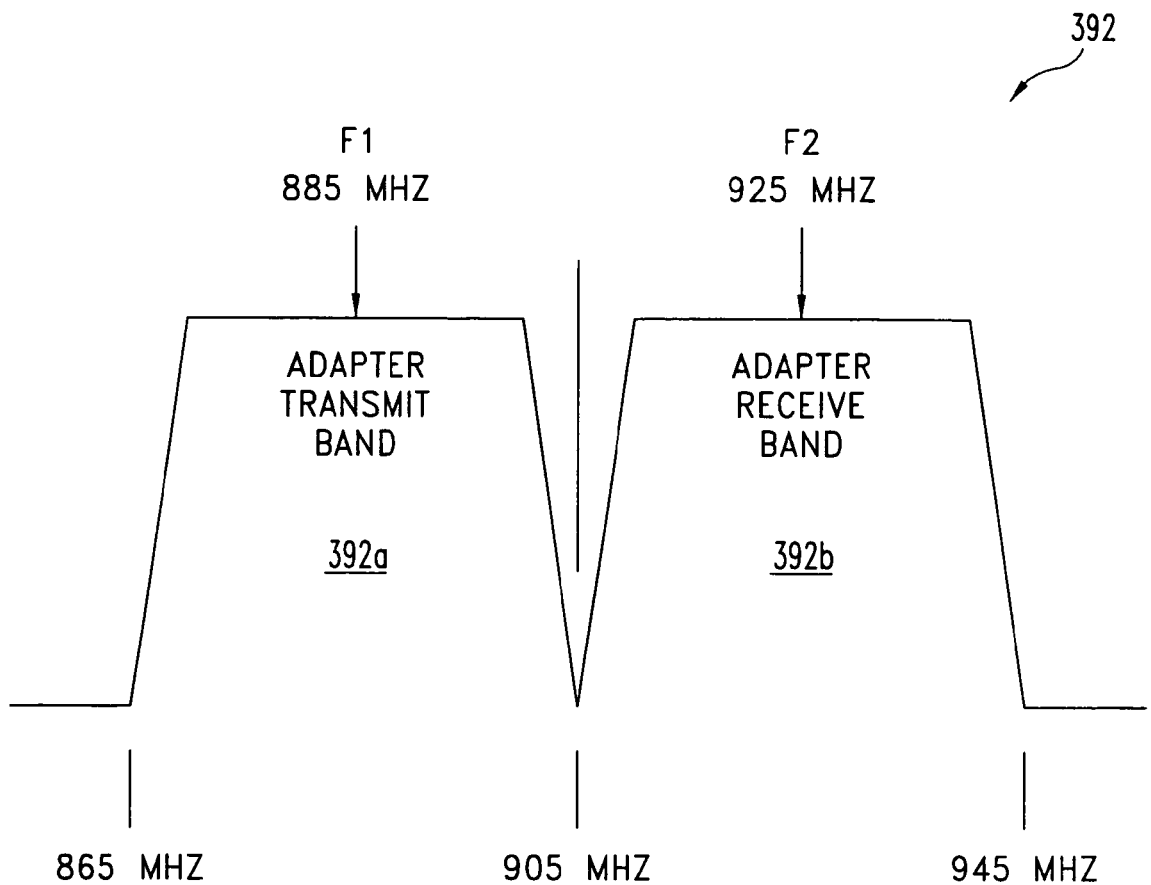
FIG. 9 is a diagrammatic view showing selected signal frequency relationships for the system of FIG. 8.

Adapter signal frequency translator 370 includes hub receiver (RXR) 360 and hub transmitter (TXR) 380. Hub receiver 360 includes input 362 and output 364. Input 364 is coupled to signal port 353c of splitter 54 to receive modulated data signals transmitted from network 351 with a frequency in an adapter transmit band centered on frequency F1. Referring additionally to FIG. 9, data signal transmission frequency range 392 is diagrammatically illustrated. Within range 392, is one nonlimiting example of an adapter transmit band 392a, which extends from 865 MHz to 905 MHz. For this example, the center frequency, F1, is 885 MHz (F1=855 MHz). Hub receiver 360 includes demodulator 366 to demodulate transmitted adapter output signals in the corresponding adapter transmit band to provide an unmodulated data signal to output 364. This unmodulated signal is typically provided in a discrete, binary form where logical ones and zeros are represented by different voltage or current levels. Such representation can be output by hub receiver 360 in serial form, parallel form, or a combination of these. Nonetheless, in other embodiments, the unmodulated signal form can be represented in a different manner.

Hub receiver 360 is coupled to hub transmitter 280. Hub transmitter 380 includes input 382 and output 284. Output 364 of hub receiver 360 is connected to input 382 of hub transmitter 380 to send the unmodulated data signals thereto. Hub transmitter 380 includes modulator 386 to remodulate the received unmodulated data signals for transmission in a frequency range corresponding to an adapter receive band with a center frequency F2. In FIG. 9, one nonlimiting example is provided as adapter receive band 392b, which extends from 905 MHz to 945 MHz. In this example, the center frequency, F2, is 925 MHz (F2=925 MHz). As shown, frequency range 392, including bands 392a and 392b, are between frequency ranges for cable television programming and satellite television programming (See FIG. 4). Unlike the model described in FIG. 4, there is no guard band between bands 392 and 392b; however, in other embodiments, one or more of the adapter transmit band and adapter receive band could be differently specified in terms of bandwidth, center frequency, location relative to cable/satellite television programming, and/or location relative to one another, just to name a few possible variations within the scope of the present application.

Output 384 is coupled to signal port 353c of splitter 54 to transmit these remodulated signals to network 351. Correspondingly, modulated adapter signals received from network 351 follow signal path 390 through converter 370 to be "up-converted" in terms of frequency range. In other embodiments, a different translation technique may be employed, such as that used in translator 58 of system 20, input signals may be down-converted instead of up-converted for retransmission to network 351, conversion to more than one other frequency band may be utilized, and/or such different conversion/translation may be employed as would occur to those skilled in the art to distinguish transmitted adapter signals from those intended for receipt by an adapter or otherwise.

Figure 10:
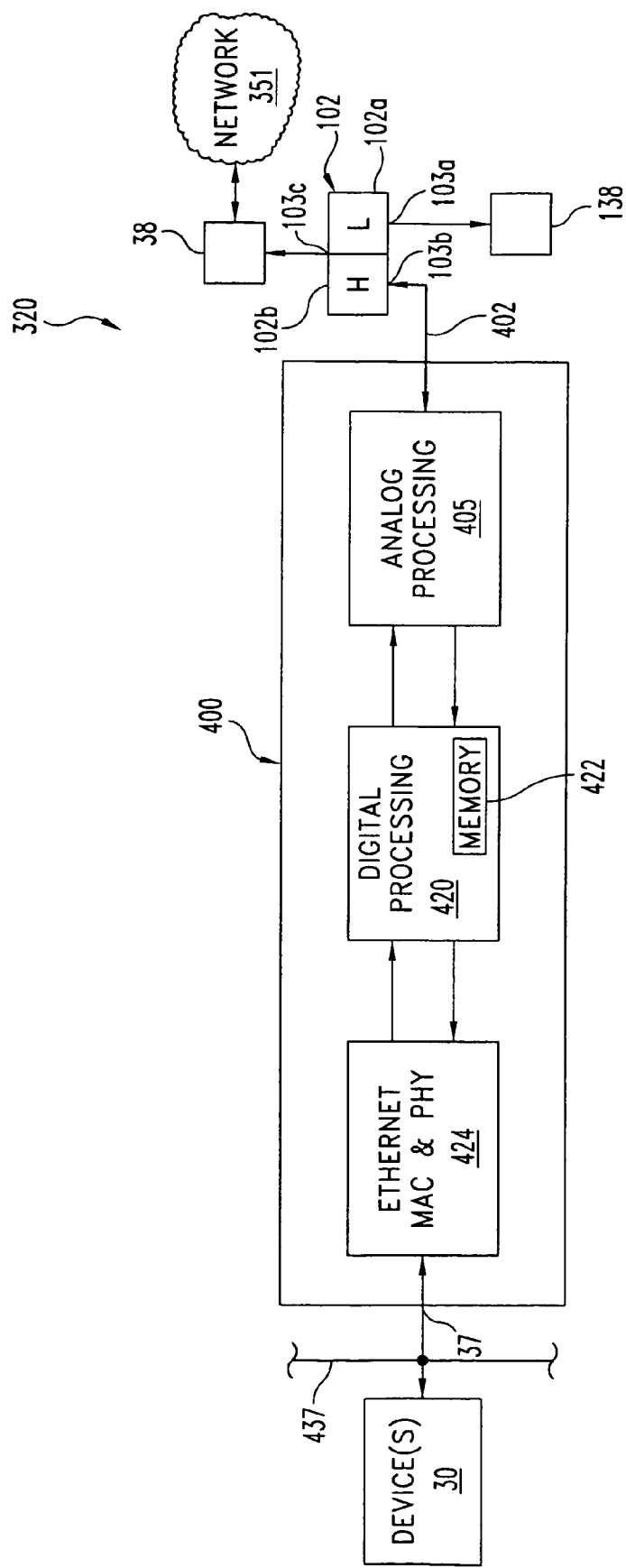
FIGS. 10 & 11 are schematic diagrams of a network communication adapter for the system of FIG. 8.

Referring to FIG. 10, further details regarding adapter 400 are next described. FIG. 10 also illustrates device(s) 30, ethernet bus port 37, connector 38, coaxial cable connection 138, and diplex filter 52, arranged as previously described in connection with adapter 100 of system 20. Ethernet bus port 437 is also illustrated in relation to port 37 and device(s) 30, and premises network 351 is shown coupled to connector 38 in FIG. 10. Adapter 400 includes several functional signal processing blocks designated as analog processing circuitry 405, digital processing circuitry 420 and ethernet control logic 424. Digital processing circuitry 420 also includes memory 422. In one application, memory 422 stores equalization information, which is specific to each of the other adapters from which signals might be received. Alternatively or additionally, memory 422 can be used to store configuration information regarding other adapters 400 and/or specifics regarding communication protocol between adapters 400 or the like. Further applications of memory 422 are described in greater detail hereinafter.

Figure 11:
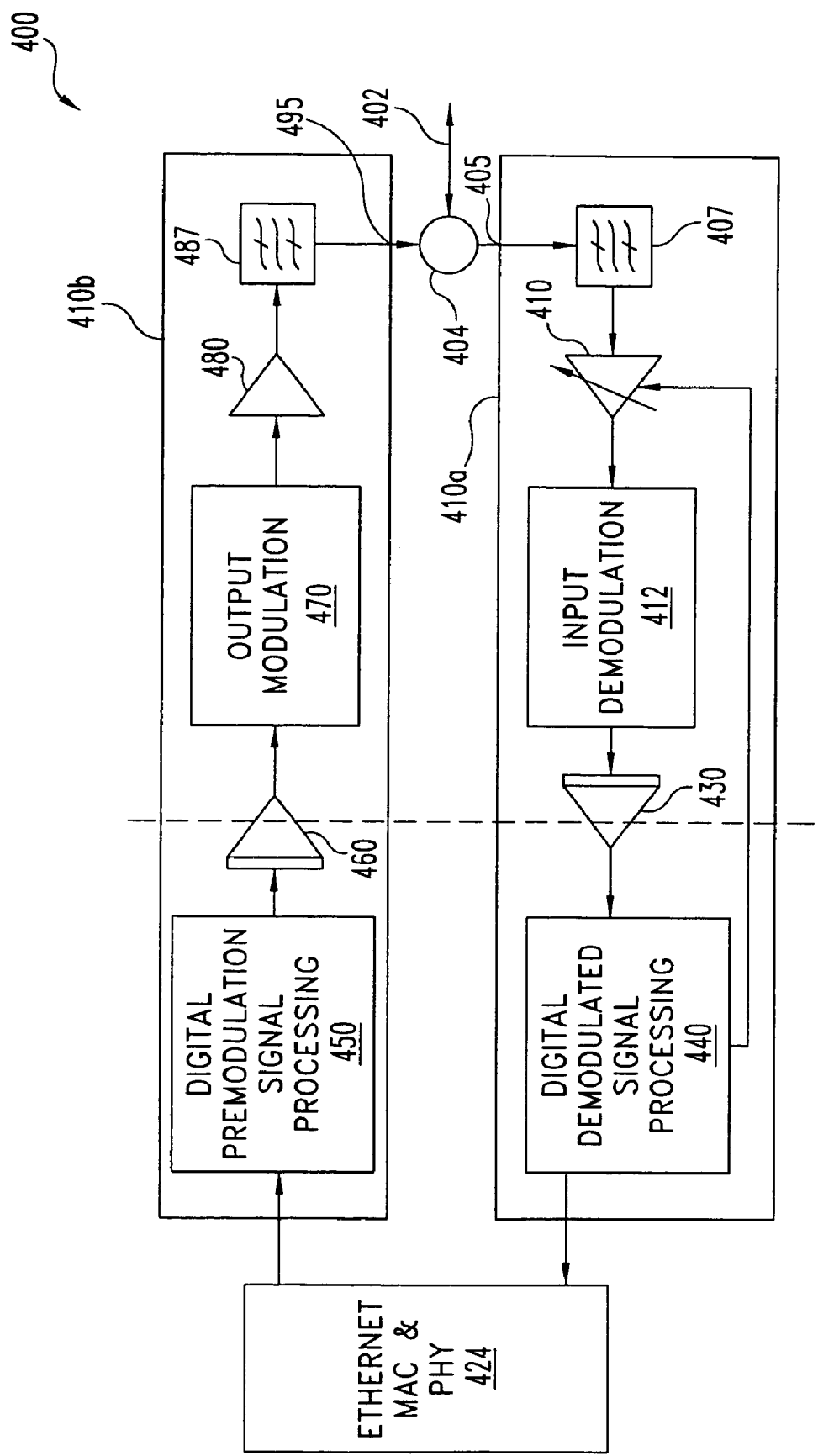

Referring additionally to FIG. 11, adapter 400 includes adapter receiver 410a and adapter transmitter 410b—each being defined by both analog processing circuitry 405 and digital processing circuitry 420. The vertical dashed line in FIG. 11 represents the transition from analog signal processing on the right to digital signal processing on the left. Adapter receiver 410a includes input 405 that receives modulated signals from network 351 via input/output interface 402. Adapter receiver 410a also includes input interference filter 407 and voltage controlled gain amplifier 410. Amplifier 410 dynamically adjusts the input signal from filter 407 to account for different degrees of signal attenuation. Amplifier 410 can be controlled in accordance with a hub-generated pilot tone (not shown), and/or in accordance with other processing and will be more fully described hereinafter.

Adapter receiver 410a further includes input signal analog demodulation circuitry 412 and analog-to-digital converter (ADC) 430. Circuitry 412 demodulates appropriately formatted input signals from amplifier 410, and provides corresponding analog signals to ADC 430 for conversion. The digital output of ADC 430 is provided to digital demodulated signal processing circuitry 440. Circuitry 440 performs appropriate digital filtering, equalization, and symbol recovery operations to provide a digital output to ethernet control logic 424.

In one form, adapter input signals provided by hub transmitter 380 to network 351 are in a Quadrature Amplitude Modulation (QAM) format. For such an arrangement, circuitry 412 of adapter receiver 410a demodulates the input signals into I and Q components, with two corresponding parallel signal processing paths. Each path is provided to a different ADC converter for digitization. ADC 430 collectively represents these multiple converters. The resulting digital outputs of each path are filtered by an appropriate Nyquist filter and processed by a digital equalizer (not shown). From the resulting equalized outputs, carrier signal recovery is performed and signal strength (amplitude) is determined. If the signal level is not within an appropriate range, corresponding processing logic adjusts amplifier 410 to put the signal level within such range. After equalization, symbol recovery is performed and the I & Q results are demultiplexed by a demultiplexor for transmission to ethernet control logic 424. In other embodiments, QAM format signals are processed differently or a different signal modulation type is employed with changes to circuitry and components of adapter receiver 410a, as appropriate.

Ethernet control logic 424 directs ethernet-based communications over bus 437 as appropriate. Typically, a given adapter 400 receives signals from all other adapters 400 after frequency translation by hub 350. Accordingly, all received signals are output by logic 424 on bus 437, and device(s) 30 are arranged to determine which received signals, if any, are of interest. Likewise, device(s) 30 forward data to logic 424 that is to be transmitted to one or more other devices 30 via one or more corresponding adapters 400.

Adapter transmitter 410b receives such data for premodulation processing with digital premodulation signal processing circuitry 450. Complementary to the QAM embodiment previously described, circuitry 450 can include a multiplexor to multiplex input digital data into parallel I and Q processing paths that are each separately provided to a digital coder, forward error correction logic, and Nyquist filter (not shown). Each processing path is input to a different digital-to-analog converter (DAC), which are collectively represented by DAC 460. The resulting analog forms of the I and Q signal paths are modulated with analog output modulation circuitry 470— being combined as a result. This modulated adapter output signal is amplified with amplifier 480, filtered with interference filter 487, and provided at output 495 to interface 402. QAM modulation can be incorporated differently and/or adjustments made to adapter transceiver 410b for other modulation schemes in alternative embodiments.

It should be appreciated that hub receiver 360 and adapter receiver 410a can be implemented with the same circuitry configuration. Alternatively or additionally, hub transmitter 380 and adapter receiver 410b can be implemented with the same circuitry configuration. In contrast, control logic 424 is placed between the receiver and transmitter of adapter 400, unlike the arrangement of hub 50. Furthermore, hub 350 can be powered with a power insertion device of the type described in connection with FIG. 7, through an alternative approach as previously described for system 20, or through such different techniques as would occur to one skilled in the art.

Figure 12:
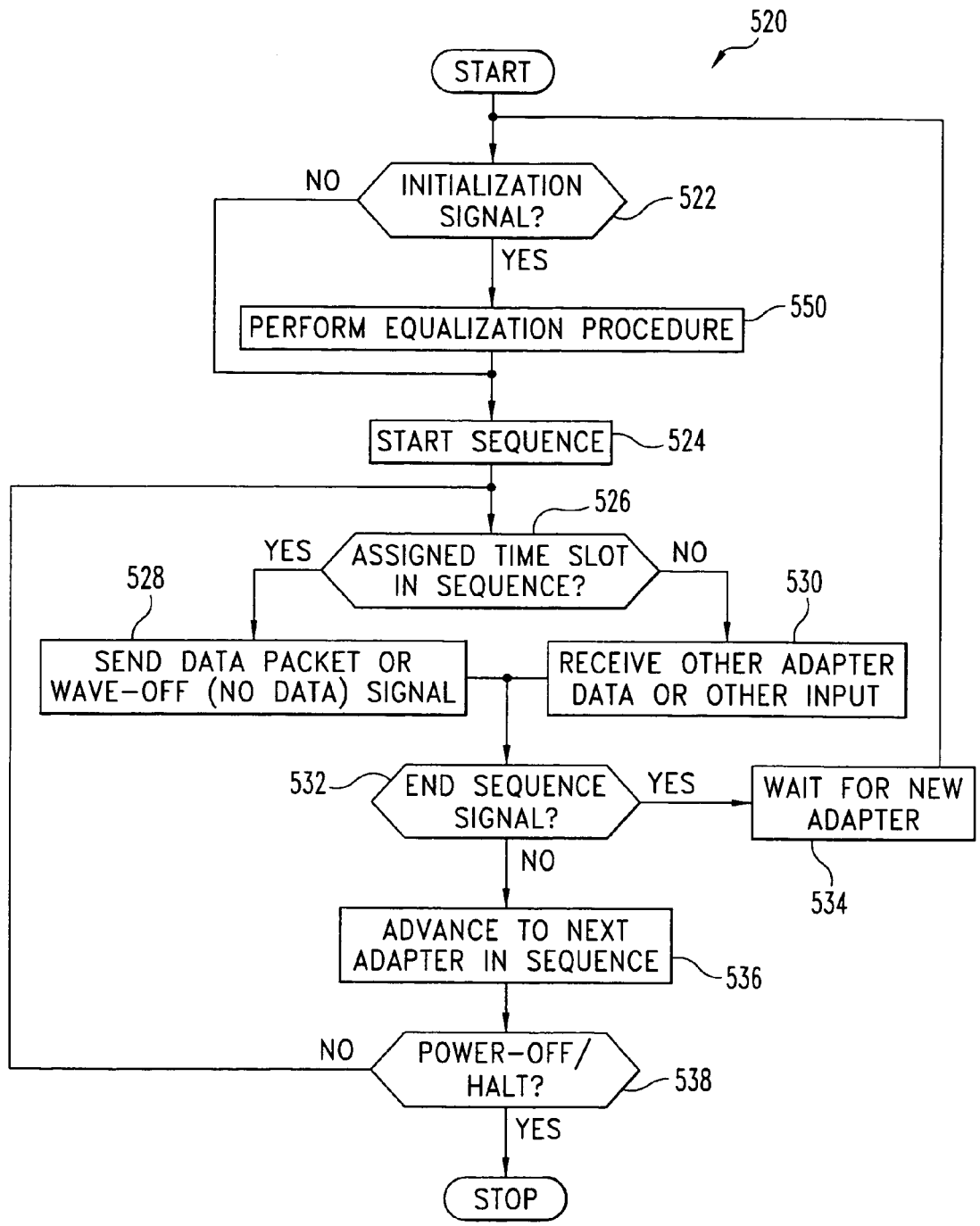
FIGS. 12 & 13 provide flowcharts of one routine for operating the system of FIG. 8.
Figure 13:
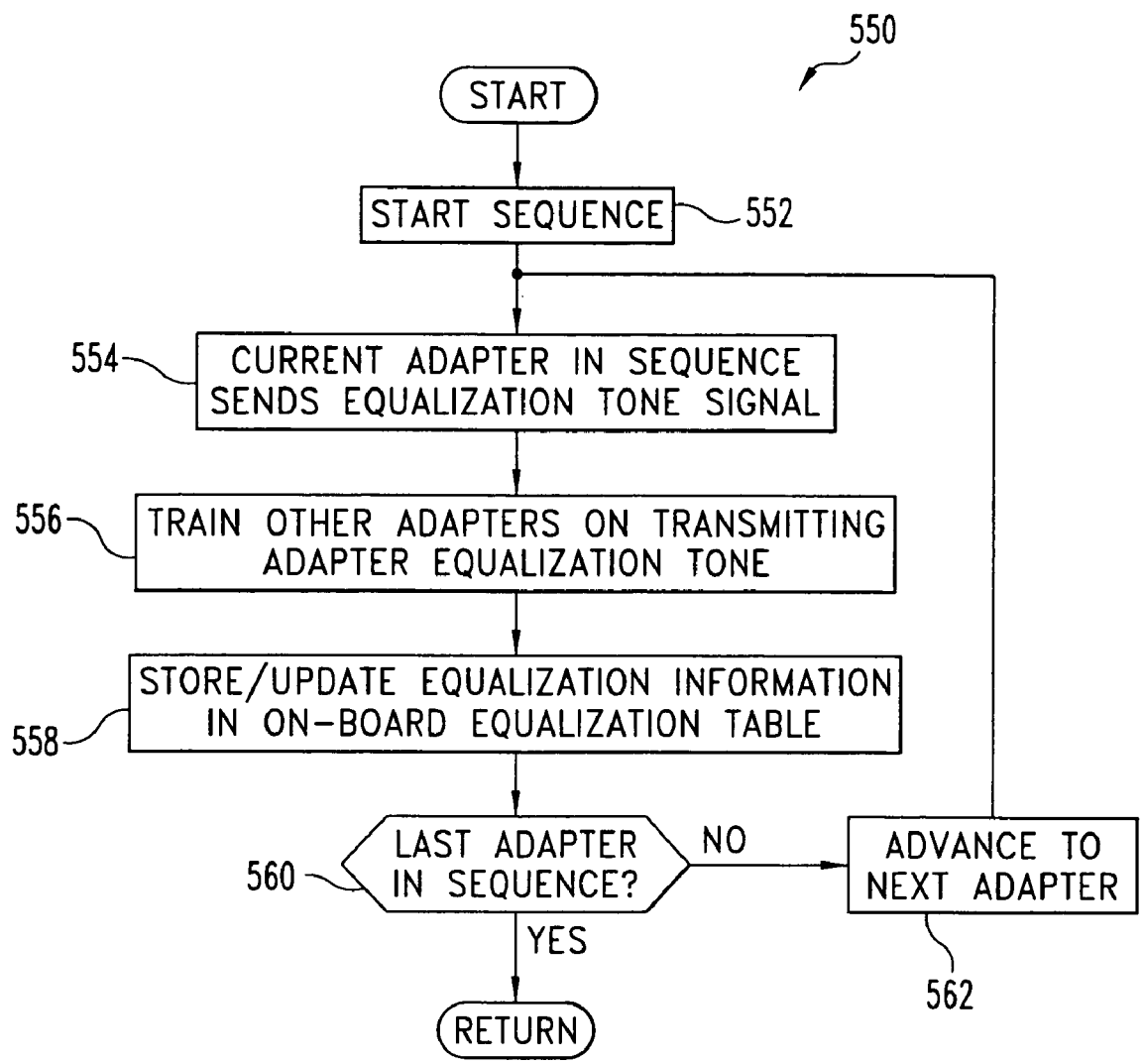

FIG. 12 depicts in flowchart form one routine 520 for operating system 320. Routine 520 begins with conditional 522 that tests whether an initialization reference signal has been transmitted by any adapter 400. If the test of conditional 522 is affirmative (true), equalization procedure 550 is executed as further described in flowchart form in FIG. 13. Procedure 550 begins by starting an adapter equalization transmission sequence in operation 552. In this sequence, each adapter 400 transmits an equalization reference signal to all other adapters 400 over network 351. This equalization reference signal is in the form of a predefined tone or series of tones that can be used to characterize signal transmission properties between the transmitting adapter 400 and each of the receiving adapters 400. Operation 554 represents the equalization reference signal transmission by the current adapter 400 of the sequence. In operation 556, the receiving adapters 400 each train on the equalization reference signal from the currently transmitting adapter 400 and develop corresponding equalization information for use in equalizing future transmissions from the currently transmitting adapter 400. In operation 558, this equalization information is stored in memory 422. Accordingly, the equalization information is specific to the transmitting adapter 400, and may vary from one receiving adapter 400 to the next because of the different signal transmission pathways involved.

From operation 558, procedure 550 continues with conditional 560. Conditional 560 test if the last adapter in the equalization sequence has been reached. If the test of conditional 560 is affirmative (true), procedure 550 terminates, returning to its caller (routine 520). This test can be based on or also include the last adapter of the sequence sending an end-of-equalization reference signal. In contrast, if the test of conditional 560 is negative (false), the equalization sequence advances to the next adapter in operation 562, looping back to operation 554. As a result, operations 554-558 are repeated for each adapter 400 so that memory 422 of each adapter includes adapter-specific equalization information to account for differences in signal transmission pathway character. Each receiving adapter 400 uses this information to equalize/adjust received signals from a transmitting adapter 400.

Returning to FIG. 12, if the test of conditional 522 is negative or procedure 550 has been performed, routine 520 continues with the start of an adapter data transmission sequence in operation 524. During this sequence, each adapter 400 is provided a time slot to transmit one or more data signals. These time slots are assigned in an established order for adapters 400 participating in network 351 communications, with switching from one to the next in a time division multiplex fashion. Each participating adapter 400 stores the transmit/receive protocol information in memory 422. Such configuration information can include the time slot assignments, the number of time slots assigned to each adapter, the quantity and any unique identifiers of participating adapters 400, and the like.

Accordingly, conditional 526 tests if a given adapter has been assigned the current time slot. If the test of conditional 526 is affirmative (true), then operation 528 is next performed. In operation 528, a data packet comprised of one or more data signals is transmitted by the corresponding transmitting adapter 400 or at least one signal is transmitted representing that such adapter is waiving its transmission time slot (a "wave-off" signal). If the transmitting adapter 400 is the last of the sequence, it further transmits an end-of-round reference signal indicating completion of the adapter data transmission sequence for known participating adapters 400.

On the other hand, if the test of conditional is negative (false), operation 530 is performed. This condition applies to all participating adapters 400 except the adapter 400 designated for the current time slot. In operation 530, these other adapters 400 (the receiving adapters 400) receive the transmitted data packet or wave off information, applying the applicable portion of the equalization information from memory 422 to equalize the received signals. Hence, for each time slot, operation 528 is performed by a single adapter 400 (the transmitting adapter), as operation 530 is performed by all other participating adapters 400 (the receiving adapters 400). In one embodiment, some or all of adapters 400 keep track of the number of wave-off signals a given adapter 400 transmits in total and/or consecutively, and takes action when a certain number is reached. For example, such adapter may be excluded from further adapter data transmission sequences until it rejoins the participating adapters. After execution of operations 528 and 530, routine 520 continues with conditional 532.

Conditional 532 tests if the last adapter of the sequence has transmitted based on the en-of-round reference signal. If the test of conditional 532 is affirmative (true), routine 520 continues with operation 534. In operation 534, a waiting period is provided for an adapter 400 not currently participating in the adapter data transmission sequence to join-in by triggering an initialization protocol in response to the end-of-round reference signal. Collisions between two or more adapters 400 attempting to join the sequence can be addressed by a back-off procedure in which each adapter waits a randomly (psuedorandomly) assigned period of time before reasserting its signal. This procedure can likewise be used to establish an initial order of adapters 400 for a sequence. Consequently, routine 520 loops back to conditional 522 from operation 534 to test for an initialization reference signal from any adapters 400 trying to join-in. Embedded in the conditional 522 test can be the collision handling procedure.

If the test of conditional 532 is negative (false), routine 520 advances to the next time slot and corresponding adapter 400 in the adapter data transmission sequence in operation 536. From operation 536, routine 520 continues with conditional 538. Conditional 538 tests if a power-off or halt command has occurred. If the test of conditional is negative (false), routine 50 continues by looping back to conditional 526 to process the next adapter transmission time slot by executing operations 528, 530, 534, and 536; and conditional 532 as appropriate. If the test of conditional 538 is affirmative (true), routine 520 halts.

Many different embodiments of routine 520 are envisioned. In one form, different transmission protocols are used. For example, the transmission technique of system 20 previously described could be used with or without an equalization procedure. Furthermore, the communication protocol could include utilization of a master adapter and/or providing a pre-established sequence order based on a unique identifier, such as a product serial number, a MAC number or the like. Alternatively or additionally, equalization information is developed differently in other embodiments. For instance, it may be developed only upon power-up and/or be provided from signal transmission characterization processing performed by a hub. In still other embodiments, equalization processing may be absent.

While system 320 has been described with QAM signal processing specifically, in other embodiments one or more different modulation techniques may alternatively or additionally be utilized. In one alternative embodiment, features of system 20 and 530 are combined or intermixed. For example, adapters 100 and 400 could both be included in a given system. Likewise, hubs 50 and 350 could be interchanged. In still other embodiments, communication protocols and corresponding circuitry or components could be added, combined, or substituted as would occur to one skilled in the art. Although the illustrated embodiments are described in terms of a coaxial cabling-based network in a dwelling—and in particular a retrofit application of earlier-installed cabling for television transmission, in other embodiments a different type of wired and/or wireless interconnection could be utilized—and is also applicable to installations initially performed to provide a computer network according to the present application.

Still another embodiment of the present invention, includes: designating a building in which previously installed coaxial cabling was operated to provide television programming; installing a coaxial computer network in the building by coupling a network hub and a number of network communication adapters together with the previously installed coaxial cabling; passing television programming signals through the cabling within a cable television frequency range; transmitting data signals from the adapters to the hub within a first frequency range; converting the data signals to frequency-converted data signals within a second frequency range at the hub for return to the adapters; and interfacing the coaxial computer network to an ethernet bus through one of the network communication adapters. This interfacing includes operating the one of the network communication adapters in a promiscuous ethernet communication mode. In one form of this embodiment, the cable television frequency range, the first frequency range, and the second frequency range are nonoverlapping relative to one another. Alternatively or additionally, this embodiment includes: supplying DC power to the hub through the previously installed wiring, and/or generating a power reference signal at the hub and sending the power reference signal to the adapters at a reference frequency outside the cable television frequency range, the first frequency range, and the second frequency range.

Yet another embodiment, includes: a coaxial cable connector; a splitter; a diplex filter including a high frequency connection, a low frequency connection coupled to the coaxial cable connector, and a combined frequency connection coupled to the splitter; a frequency translator coupled to the high frequency connection of the diplex filter; and a signal generator coupled to the high frequency connection of the diplex filter to provide a power reference signal through the splitter. The diplex filter is operable to pass television programming within a first frequency range from the coaxial cable connector through the low frequency connection to the splitter, and the frequency translator is operable to convert signals received from the splitter within a second frequency range to return signals within a third frequency range for output through the splitter. Various forms of this embodiment may further include: a number of adapters each having a transmitter operable to selectively transmit modulated output signals in the second frequency range to the hub, a receiver operable to receive modulated input signals from the hub within the third frequency range, interface circuitry coupled to the receiver and the transmitter with logic to communicate selected information from the receiver to an ethernet bus and to send other information from the ethernet bus to the transmitter, and control circuitry coupled to the transmitter and the receiver that is selectively responsive to the power reference signal from the hub.

A further embodiment of the present invention includes: a computer network hub that has a coaxial cable connector; a splitter including a plurality of ports; a diplex filter including a high frequency connection, a low frequency connection coupled to the coaxial cable connector, and a combined frequency connection coupled to the splitter; and a frequency translator coupled to the high frequency connection of the diplex filter. The diplex filter passes television programming within a first frequency range from the coaxial cable connector through the low frequency connection to the splitter. The frequency translator converts signals received from the splitter within a second frequency range to return signals within a third frequency range for output through the splitter. The embodiment further includes a power insertion device to couple to one of the ports through coaxial cabling and a power supply with a current limiter to couple to the power insertion device. The power insertion device provides electrical power to the hub through the coaxial cabling and splitter when the power insertion device is coupled to the power supply and the power supply is connected to a power source.

Yet a further embodiment includes: providing a computer network with a number of network communication adapters and a network hub having a hub receiver and a hub transmitter; with one or more of the network communication adapters, transmitting data signals modulated for transmission to the network hub within a first frequency range through the computer network; demodulating the data signals in the first frequency range with the hub receiver to provide the data signals in an unmodulated form; sending the data signals in the unmodulated form from the hub receiver to the hub transmitter; modulating the data signals from the hub receiver with the hub transmitter for transmission in a second frequency range through the computer network; and at each of the adapters, receiving the data signals transmitted in the second frequency range from the network hub.

Further, by way of nonlimiting example this embodiment can include: designating a building in which previously installed coaxial cabling was utilized to provide television programming; installing the computer network in the building by coupling the network hub and the adapters together with the previously installed coaxial cabling; and passing television programming signals through the cabling within a cable television frequency range. In one form with such addition, the cable television frequency range does not overlap the first or second frequency ranges and/or at least a portion of the first frequency range does not overlap the second frequency range. Alternatively or additionally, the embodiment may include: generating a reference signal to direct operation of one or more of the network communication adapters (such reference signal may correspond to a pilot signal from the hub for use as a power reference and/or an equalization signal to generate equalization information for each of the network communication adapters); and/or performing an adapter equalization transmission sequence.

Another embodiment of the present invention includes a computer network hub having a coaxial cable interface, a splitter including a signal port and a plurality of coaxial cable ports, a hub receiver, a hub transmitter, and a filter. The splitter bidirectionally passes signals between the signal port and the coaxial cable ports. The signal port is coupled to the coaxial cable interface. The hub receiver includes an input to receive data signals modulated for transmission to the network hub within a first frequency range from one or more of the coaxial cable ports. The hub receiver is operable to demodulate the data signals from the input for output in an unmodulated form. The hub transmitter is connected to the receiver to receive the data signals in the unmodulated form, and is operable to remodulate the data signals for transmission within a second frequency range. The hub transmitter includes an output to send the data signals through the splitter after remodulation. The filter is connected between the coaxial cable interface and the signal port of the splitter. The filter is operable to reduce transmissions through the coaxial cable interface in the first frequency range and the second frequency range.

One nonlimiting arrangement of this embodiment includes a plurality of network communication adapters each connected to one of the coaxial cable ports to define a computer network. These adapters each include an adapter transmitter operable to transmit the data signals in the first frequency range to the network hub and an adapter receiver to receive the data signals in the second frequency range from the network hub. Alternatively or additionally, the coaxial cable interface is connected at a point of entry of coaxial cable for cable television service and at least a portion of the coaxial cable ports of the splitter are coupled to pre-installed coaxial cabling for the cable television service; and/or the adapters are each coupled to coaxial cabling in a different room of a home, with the adapters each including means for characterizing signal transmission through the computer network by broadcasting a reference signal to at least a subset of the adapters and means for adjusting signal processing of each of the adapters based on the characterizing means. This characterizing means can include means for sending an equalization reference signal from each respective one of the adapters to other of the adapters and/or includes means for sending a power reference signal from the network hub to the adapters. Respectively, the adjusting means can include equalization information stored in the respective one of the adapters to equalize the computer signals received from the other of the adapters and/or circuitry responsive to the power reference signal to regulate received signal gain.

Still another embodiment includes: providing a computer network with a number of network communication adapters and a network hub; performing an adapter equalization transmission sequence to characterize adapter signal transmission through the computer network. Performance of this equalization transmission sequence includes each of the network communication adapters in turn: sending an equalization reference signal to other of the network communication adapters through the computer network in accordance with the adapter equalization sequence and storing respective equalization information based on the equalization reference signal received from the other of the network communication adapters. Alternatively or additionally, this embodiment further includes performing an adapter data transmission sequence to communicate computer data between the adapters. Performance of this data transmission sequence includes each one of the network communication adapters: transmitting an adapter output signal in a first frequency range through the computer network to the network hub in accordance with the adapter data transmission sequence; the network hub converting the adapter output signal to an adapter input signal in a second frequency range with at least a portion of the second frequency range not overlapping the first frequency range; and at least one other of the network communication adapters receiving the adapter input signal through the computer network and processing the adapter input signal in accordance with the respective equalization information stored therewith. In one particular form, this embodiment includes: designating a building in which previously installed coaxial cabling was utilized to provide television programming and establishing the computer network in the building by coupling the network hub and the network communication adapters together with the previously installed coaxial cabling.

In a further embodiment, an apparatus, comprises: a network contained within a building that includes a network hub and a number of network communication adapters coupled together by coaxial cabling; means for passing television programming signals through the cabling within a cable television frequency range; means for transmitting data signals from one or more of the adapters to the network hub in a first frequency range; means for frequency converting the data signals received at the hub in the first frequency range to a second range for transmission to the adapters; means for receiving the data signals in the second frequency range at each of the adapters; and means for broadcasting a reference signal through the network to more than one of the adapters to characterize signal transmission through the network before communicating the data signals. The receiving means adjusts adapter signal processing in response to the reference signal. In various nonlimiting forms of this embodiment, the cable television frequency range does not overlap the first or second frequency ranges, at least a portion of the first frequency range does not overlap the second frequency range, the broadcasting means is included in the network hub and the reference signal is a pilot signal to provide a power reference for each of the adapters, and/or the broadcasting means is included in each of the adapters and the reference signal is an equalization signal sent by each one of the adapters to other of the adapters to develop equalization information about the signal transmission of the one of the adapters for storage in each of the other of the adapters.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined herein or by following claims are desired to be protected.

What is claimed is:

1. A method, comprising:
designating a building in which previously installed wiring was utilized to transmit telephone communications or television programming;
installing a computer network in the building by coupling a network hub and a number of network communication adapters together with the previously installed wiring;
at the hub, generating a reference signal at a reference frequency for transmission to the adapters through the wiring;
adjusting signal power level in response to the reference signal at one or more of the adapters; and
at the hub, converting computer data signals sent by one of the adapters from a first frequency range to second frequency range for transmission to another of the adapters, the reference frequency being outside the first frequency range and the second frequency range.

2. The method of claim 1, which includes supplying power to circuitry of the hub through the previously installed wiring.

3. The method of claim 1, wherein the wiring is in the form of coaxial cabling operable to provide the television programming within a third frequency range below the first frequency range and the second frequency range.

4. The method of claim 1, which includes:
establishing the reference frequency between the first frequency range and the second frequency range;
setting the first frequency range and the second frequency range above a television transmission frequency range for cable television; and
setting the first frequency range and the second frequency range below a transmission frequency range for satellite-received television.

5. The method of claim 1, which includes performing said adjusting once with each power cycle of a corresponding one of the adapters.

6. The method of claim 1, wherein the building is a residential dwelling and the wiring is coaxial cabling previously installed in the dwelling and further comprising:
transmitting the television programming through the wiring after said installing; and
routing the television programming to a number of televisions in the residential dwelling through a diplex filter included with the hub.

7. The method of claim 6, which includes:
coupling a first one of the adapters to a first device in a first room of the dwelling;
coupling a second one of the adapters to a second device in a second room of the dwelling; and
communicating between the first device and the second device through the first one of the adapters, the second one of the adapters, the hub, and the coaxial cabling.

8. The method of claim 7, which includes:
establishing the reference frequency between the first frequency range and the second frequency range;
setting the first frequency range and the second frequency range above a television transmission frequency range for household cable television;
setting the first frequency range and the second frequency range below a television transmission frequency range for household transmission of satellite television; and coupling the hub between the coaxial cabling in the dwelling and a cable external to the dwelling, the cable external to the dwelling being coupled to a low frequency band of the diplex filter;
providing a splitter with the hub to perform said routing;
providing a frequency translator to perform said converting, the frequency translator being coupled to a high frequency band of the diplex filter; and
a signal generator coupled to the diplex filter to provide the reference signal through the splitter.

9. A method, comprising:
designating a building in which previously installed coaxial cabling was utilized to provide television programming;
installing a computer network in the building by coupling a network hub and a number of network communication adapters together with the previously installed coaxial cabling, the network hub including a hub receiver and a hub transmitter;
passing television programming signals through the cabling within a cable television frequency range;
with one or more of the network communication adapters, transmitting data signals modulated for transmission to the network hub within a first frequency range through the computer network;
at the hub, demodulating the data signals in the first frequency range with the hub receiver to provide the data signals in an unmodulated form;
sending the data signals in the unmodulated form from the hub receiver to the hub transmitter;
modulating the data signals from the hub receiver with the hub transmitter for transmission in a second frequency range through the computer network; and
at each of the adapters, receiving the data signals transmitted in the second frequency range from the network hub, wherein the cable television frequency range does not overlap the first frequency range, the cable television frequency range does not overlap the second frequency range, and at least a portion of the first frequency range does not overlap the second frequency range.

10. The method of claim 9, which includes interfacing the computer network to an ethernet bus through one of the network communication adapters.

11. The method of claim 9, which includes supplying DC power to the network hub through the previously installed coaxial cabling.

12. The method of claim 9, which includes generating a reference signal to direct operation of one or more of the network communication adapters.

13. The method of claim 12, wherein the reference signal corresponds to execution of a transmission protocol by the network communication adapters.

14. The method of claim 12, wherein the reference signal corresponds to an equalization tone to generate equalization information for each of the network communication adapters.

15. The method of claim 12, wherein the reference signal corresponds to an initialization signal.

16. The method of claim 9, wherein said modulating includes modulating the data signals in a QAM format.

17. The method of claim 9, which includes performing adapter equalization by: each of the network communication adapters sending an adapter equalization signal; storing adapter equalization information in each of the adapters; and determining the adapter equalization is completed.

18. The method of claim 9, wherein the building is a residential dwelling and further comprising:
transmitting the television programming through the coaxial cabling after said installing;
routing the television programming to a number of televisions in the dwelling during said transmitting; and
setting the first frequency range and the second frequency range above the cable television frequency range.

19. The method of claim 9, wherein the building is a residential dwelling and further comprising:
coupling a first one of the network communication adapters to a first device in a first room of the dwelling;
coupling a second one of the network communication adapters to a second device in a second room of the dwelling; and
communicating between the first device and the second device through the first one of the network communication adapters, the second one of the network communication adapters, the network hub, and the coaxial cabling.

20. A system, comprising:
a network including a number of network connectors wired together within a building;
a hub coupled to the network between the connectors and wiring external to the building and operable to pass communication signals from wiring external to the building to the connectors, the hub including a frequency translator to translate received data signals in a first frequency range to a second frequency range and a signal generator to provide a power reference signal within a third frequency range, the first frequency range, the second frequency range, and the third frequency range each being nonoverlapping relative to one another; and
a number of network adapters each including a transmitter to transmit modulated outgoing signals within the first frequency range over the network to the hub, a receiver to receive modulated incoming data signals from the hub within the second frequency range, and power control circuitry responsive to the reference signal within the third frequency range to adjust signal power level.

21. The system of claim 20, wherein the adapters each include interface circuitry coupled to the receiver and the transmitter, the interface circuitry including logic to communicate selected information from the receiver to an ethernet bus and to send other information from the ethernet bus to the transmitter.

22. The system of claim 20, wherein the network is in the form of coaxial cabling and the building is in the form of a residential dwelling.

23. The system of claim 20, wherein at least one of the connectors is coupled to a television within the dwelling, and the hub includes:
a splitter; and
a diplex filter including a high frequency band, a low frequency band, and a combined frequency connection coupled to the splitter, the diplex filter being operable to pass television programming within a fourth frequency range from the wiring external to the dwelling to the splitter through the low frequency band.

24. The system of claim 23, further comprising:
a first device located in a first room of the dwelling coupled to a first one of the adapters;
a second devices located in a second room of the dwelling coupled to a second one of the adapters; and
wherein the first device and the second device are operable to communicate with one another through the hub via the network.

25. A system, comprising: a computer network hub including:
- a coaxial cable interface;
- a splitter including a signal port and a plurality of coaxial cable ports, the splitter being operable to transmit signals between the signal port and the coaxial cable ports, the signal port being coupled to the coaxial cable interface;
- a hub receiver including an input to receive data signals modulated for transmission to the network hub within a first frequency range from one or more of the coaxial cable ports, the hub receiver being operable to demodulate the data signals from the input for output in an unmodulated form;
- a hub transmitter connected to the receiver to receive the data signals in the unmodulated form, the hub transmitter being operable to remodulate the data signals for transmission within a second frequency range, the hub transmitter including an output to send the data signals through the splitter after remodulation; and
- a filter connected between the coaxial cable interface and the signal port of the splitter, the filter being operable to reduce transmissions through the coaxial cable interface in the first frequency range and the second frequency range, at least a portion of the second frequency range not overlapping the first frequency range, and the first frequency range and the second frequency range not overlapping a cable television frequency range.

26. The system of claim 25, further comprising a plurality of network communication adapters each connected to one of the coaxial cable ports to define a computer network, the adapters each including an adapter transmitter operable to transmit the data signals in the first frequency range to the network hub and an adapter receiver to receive the data signals in the second frequency range from the network hub.

27. The system of claim 26, wherein the adapters each include an interface to an ethernet bus and further comprising a plurality of devices each coupled to the ethernet bus of a different one of the adapters, the devices each being operable to receive at least a portion of the data signals over the ethernet bus of the different one of the adapters.

28. The system of claim 26, wherein:
- the coaxial cable interface is connected at a point of entry of coaxial cable for cable television service and at least a portion of the coaxial cable ports of the splitter are coupled to pre-installed coaxial cabling for the cable television service; and
- the adapters are each coupled to coaxial cabling in a different room of a home, and the adapters each including means for characterizing signal transmission through the computer network by broadcasting a reference signal to at least a subset of the adapters and means for adjusting signal processing of each of the adapters based on the characterizing means.

29. The system of claim 28, wherein the characterizing means includes means for sending an equalization reference signal from each respective one of the adapters to other of the adapters and the adjusting means includes equalization information stored in the respective one of the adapters to equalize the data signals received from the other of the adapters.

30. The system of claim 28, wherein the characterizing means includes means for sending a power reference signal from the network hub to the adapters, and the adjusting means includes circuitry responsive to the power reference signal to regulate adapter received signal gain.

31. The system of claim 28, wherein the first frequency range and the second frequency range are above the cable television frequency range, the adapter transmitter being operable to modulate the data signals with a QAM format in the first frequency range, the hub receiver being operable to demodulate the data signals in the first frequency range in the QAM format, the hub transmitter being operable to modulate the data signals with the QAM format in the second frequency range, and the adapter receiver being operable to demodulate the data signals in the second frequency range in the QAM format.

32. A method, comprising:
- designating a building in which previously installed coaxial cabling was utilized to provide television programming;
- establishing a computer network in the building by coupling a network hub and a number of network communication adapters together with the previously installed coaxial cabling;
- performing an adapter equalization transmission sequence to characterize adapter signal transmission through the computer network, that includes each of the network communication adapters in turn:
  - sending an equalization reference signal to other of the network communication adapters through the computer network in accordance with the adapter equalization sequence;
  - storing respective equalization information based on the equalization reference signal received from the other of the network communication adapters during said sending;
- performing an adapter data transmission sequence to communicate data between the adapters, that includes each one of the network communication adapters:
  - transmitting an adapter output signal in a first frequency range through the computer network to the network hub in accordance with the adapter data transmission sequence;
  - the network hub converting the adapter output signal to an adapter input signal in a second frequency range with at least a portion of the second frequency range not overlapping the first frequency range; and
  - at least one other of the network communication adapters receiving the adapter input signal through the computer network and processing the adapter input signal in accordance with the respective equalization information stored therewith.

33. The method of claim 32, wherein said performing an adapter data transmission sequence includes allocating each of a number of different transmission time slots to a different one of the adapters.

34. The method of claim 32, wherein said converting includes:
- demodulating the adapter output signal in the first frequency range to provide a corresponding unmodulated signal; and
- remodulating the corresponding unmodulated signal to provide the adapter input signal in the second frequency range.

35. The method of claim 32, which includes sending a reference signal corresponding to an end of the transmission sequence from a last one of the adapters to transmit in the adapter data transmission sequence.

36. The method of claim 32, wherein said processing includes equalizing the adapter input signal with the respective equalization information, the respective equalization information including a different data set for each of the other of the adapters.

37. The method of claim 32, which includes:
placing each of the adapters in a different room of a dwelling, the adapters being coupled to the network hub by coaxial cabling; and
transmitting cable television programming on the coaxial cabling during said performing the adapter equalization transmission sequence and during said performing the adapter data transmission sequence.

38. The method of claim 37, which includes:
connecting a coaxial cable interface of the hub to television cabling entering the dwelling; and
connecting the coaxial cabling to one or more coaxial cable ports of a splitter included in the hub.

39. The method of claim 32, wherein the first frequency range and the second frequency range are above a cable television frequency range, each of the adapters includes an adapter transmitter operable to modulate data signals with a QAM format in the first frequency range, the hub includes a hub receiver operable to demodulate the data signals in the first frequency range in the QAM format, the hub includes a hub transmitter operable to modulate the data signals with the QAM format in the second frequency range, and each of the adapters includes an adapter receiver operable to demodulate the data signals in the second frequency range in the QAM format.

40. An apparatus, comprising:
a network contained within a building, the network including a network hub and a number of network communication adapters coupled together by coaxial cabling;
means for passing television programming signals through the cabling within a cable television frequency range;
means for transmitting data signals from one or more of the adapters to the network hub in a first frequency range;
means for frequency converting the data signals received at the hub in the first frequency range to a second range for transmission to the adapters, the cable television frequency range not overlapping the first frequency range, the cable television frequency range not overlapping the second frequency range, and at least a portion of the first frequency range not overlapping the second frequency range;
means for receiving the data signals in the second frequency range at each of the adapters; and
means for broadcasting a reference signal through the network to more than one of the adapters to characterize signal transmission through the network before communicating the data signals, the receiving means adjusting adapter signal processing in response to the reference signal.

41. The apparatus of claim 40, wherein the broadcasting means is included in the network hub and the reference signal is a pilot signal to provide a power reference for each of the adapters.

42. The apparatus of claim 41, wherein the broadcasting means is included in each of the adapters, and the reference signal is an equalization signal sent by each one of the adapters to other of the adapters to develop equalization information about the signal transmission from the one of the adapters for storage in each of the other of the adapters.

43. A system, comprising:
a computer network hub including:
a coaxial cable interface;
a splitter including a plurality of coaxial cable ports;
a filter including a first connection to the coaxial cable interface and a second connection to the splitter, the filter being operable to pass television programming within
a first frequency range from the coaxial cable interface to the splitter;
a frequency translator coupled to the splitter, the frequency translator being operable to convert signals received from the splitter within a second frequency range to return signals within a third frequency range for output through the splitter;
a power insertion device to connect to one of the coaxial cable ports through coaxial cabling;
a power supply with a current limiter to connect to the power insertion device; and
wherein the power insertion device is operable to provide electrical power to the hub through the coaxial cabling and splitter when the power insertion device is coupled to the power supply and the power supply is connected to a power source.

44. The system of claim 43, further comprising a number of network communication adapters coupled to a corresponding number of the ports of the splitter, the adapters each including means for performing an equalization transmission sequence to characterize signal transmission through the network.

45. The system of claim 43, wherein the power insertion device and the power supply are located in a room of a building and the hub is not located in the room.

46. The system of claim 43, further comprising a network communication adapter coupled to the power insertion device by further cabling.

* * * * *